Figure 1:
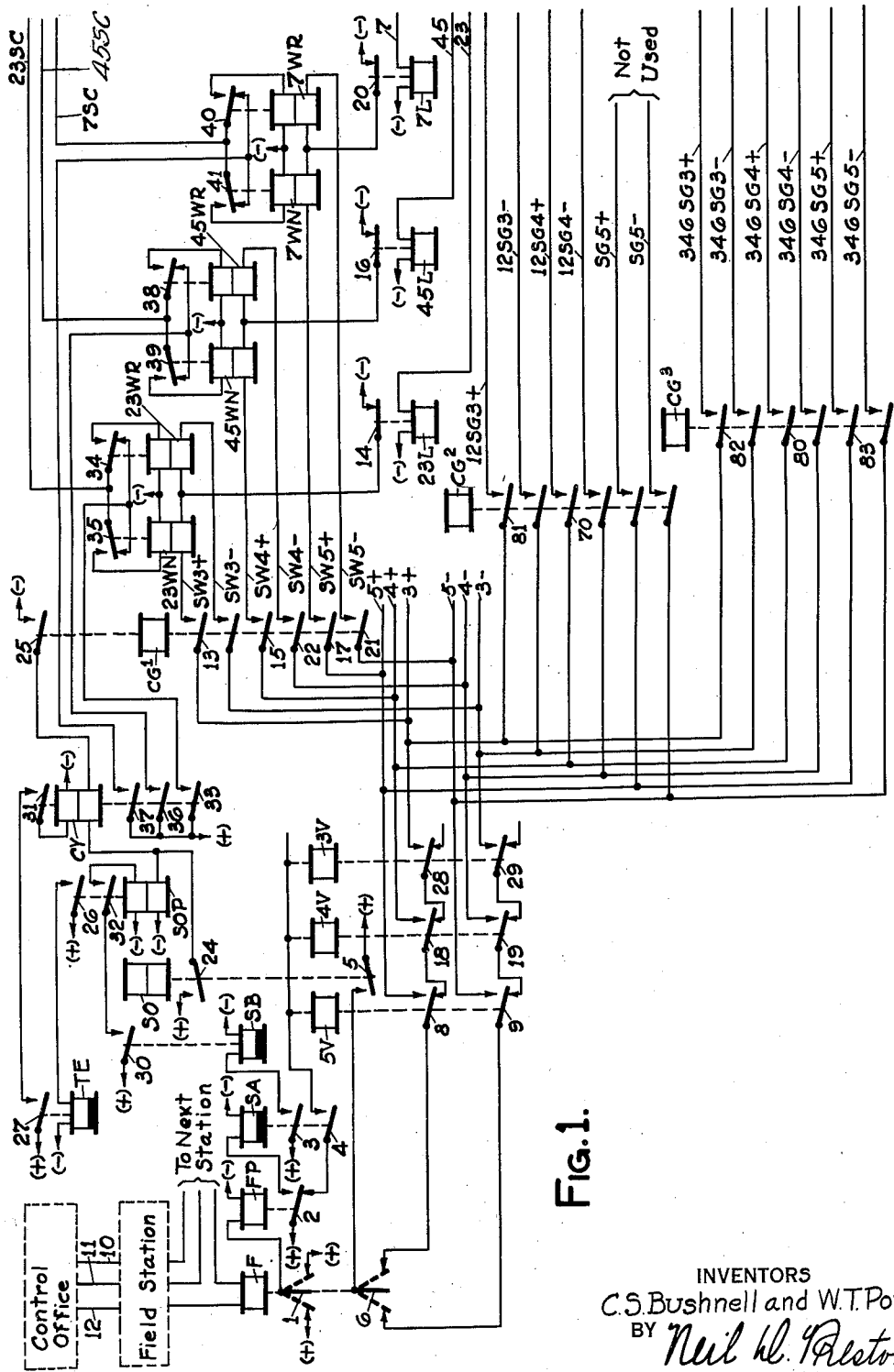

INVENTORS
C.S.Bushnell and W.T.Powell
BY Neil H. Preston
THEIR ATTORNEY

Nov. 10, 1936. C. S. BUSHNELL ET AL 2,060,413
INTERLOCKING SYSTEM FOR RAILROADS
Filed Sept. 6, 1934 6 Sheets-Sheet 4

INVENTORS
C.S. Bushnell and W.T. Powell
BY Neil W. Preston
THEIR ATTORNEY

Nov. 10, 1936.  C. S. BUSHNELL ET AL  2,060,413

INTERLOCKING SYSTEM FOR RAILROADS

Filed Sept. 6, 1934   6 Sheets—Sheet 6

Fig. 6.

All SCS Relays = 40$^w$
1R = 40$^w$
2R = 40$^w$
3R = 40$^w$
4R = 40$^w$
5R = 40$^w$
6R = 40$^w$
7R = 40$^w$
8R = 80$^w$
9R = 40$^w$ INVENTORS
C.S.Bushnell and W.T.Powell
BY Neil W. Preston
THEIR ATTORNEY Patented Nov. 10, 1936

2,060,413

UNITED STATES PATENT OFFICE 2,060,413

INTERLOCKING SYSTEM FOR RAILROADS

Charles S. Bushnell and Winfred T. Powell, Rochester, N. Y., assignors to General Railway Signal Company, Rochester, N. Y.

Application September 6, 1934, Serial No. 742,952

28 Claims. (Cl. 246—3)

This invention relates to interlocking systems for railways and it more particularly pertains to an electrical interlocking system controlled from a central control office through the medium of a communication system of the station selective coded type.

In an electrical interlocking system the setting up of a particular route through the track layout results in the establishment of a route cincuit having portions which conform precisely with the various mechanical portions of the track layout. The route circuit thus established is then employed for determining the direction of traffic over the corresponding route. In such an interlocking system the route circuit portions for clearing the signal of a particular route conform precisely with the various mechanical portions of the track layout so that as a route is set up mechanically in the track rails a corresponding condition is set up electrically in the route circuit portions.

In accordance with the present invention it is proposed to provide a system of the type above outlined in which the electrical route portions are governed from a central control office, these route portions not being completed until the locking of each of the track switches included in a route is actually effected. In other words, a lock relay which is normally energized whenever it is safe for a track switch to be operated but is de-energized whenever a track switch should be maintained in its last operated position, is provided with back contacts that are included in those electrical route circuits which are associated with those routes that may be set up over that particular track switch. This arrangement insures the reliability and safety features necessary for an interlocking system.

The present invention further provides a system of the type above outlined which, due to the complicated track layout, requires the transmission of the switch and signal controls on more than one cycle of operation of the communication system. In other words, where the number of switches and signals is of such an amount that it is impractical to control all of these switches and signals on one cycle of the communication system, additional cycles are employed and the circuits are so arranged that the switch and signal controls can be received in any order, that is switch controls can be received during the first cycle and signal controls through a following cycle or vice versa.

In a centralized traffic controlling system of the type contemplated by this invention, communication is established between a central control office and a number of outlying field stations by means of a station selective coded type communication system. In a system of this type a plurality of series of impulses of different code combinations are transmitted over the line circuit connecting the control office and the field stations. The first portion of each different series of code combinations is employed for selecting the stations, while the latter portion of each series of code combinations is employed to control the traffic controlling devices at the selected station. Furthermore, a plurality of groups, which may be considered a plurality of stations, are provided at a single location and these groups or stations are selected following the selection of the location. The different groups or stations function to direct the coded impulses to the switch control relays and to the signal control relays on separate cycles, due to the fact that the total number of these control relays is such that it is inconvenient to control them on one cycle.

In a centralized traffic controlling system of the type contemplated by this invention, various indications are displayed in the control office to indicate the presence or absence of trains on the various track sections and to indicate the operated positions of the various switches, signals and the like. Since the present invention is particularly directed to the reception of outbound controls and since the operation of such a system in connection with the transmission of in-bound indications may be of any approved type such for example, as disclosed in the pending application of Hailes et al., Ser. No. 526,674, filed March 31, 1931, the present description will be directed entirely to the reception of and the control by coded control impulses from a control office, such as disclosed in the above mentioned Hailes et al. application, at a typical location illustrated in the accompanying drawings.

These characteristic features of the invention thus briefly stated will be explained more in detail in the following description of one embodiment of the invention and the various functions and advantages of a system employing this invention will be in part pointed out and in part apparent as the description progresses.

In the accompanying drawings the invention has been shown applied to a track layout at a single location having two main track routes with two crossovers and a turn-out section, but it should be understood that the invention is not thus limited since it may be readily applied to various other combinations of track layouts.

In describing the invention in detail reference will be made to the accompanying drawings in which similar parts throughout the several views are designated by similar reference characters, some of which are provided with preceding numerals to indicate the order of operation or the association of the particular device with a corresponding track switch signal or the like.

Fig. 1 illustrates the apparatus and circuit arrangement provided at a typical location for receiving the different series of coded impulses from the control office and for recording certain of these impulses on switch control relays. This figure illustrates the locking of these switch control relays, the extension of the channel circuits to the switch and signal control circuits and the time element cycle bridging arrangement all of which will be explained in detail.

Figure 2:
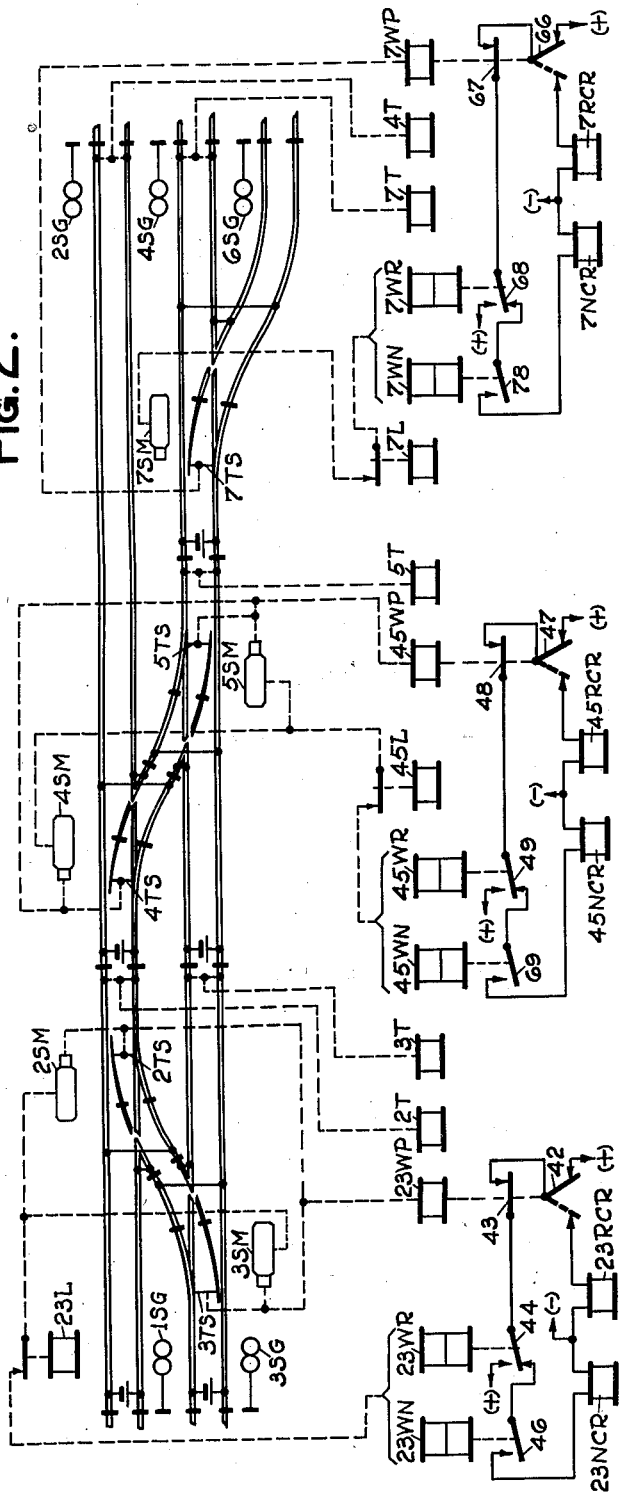

Fig. 2 illustrates a track lay-out to which the present invention is applied, together with the correspondence circuits controlled by the switch control and switch repeating relays.

Figure 3:
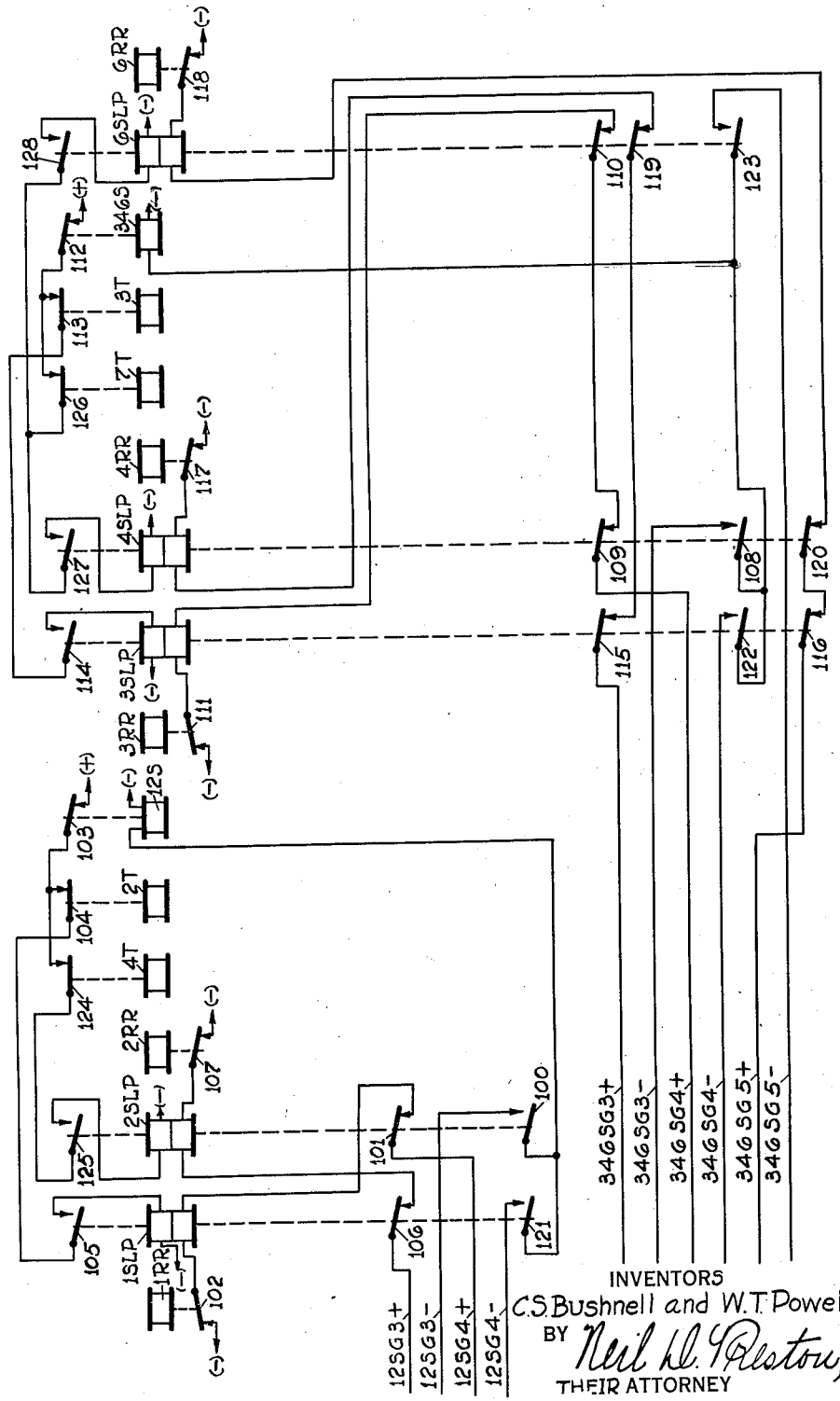

Fig. 3 indicates the control of the signal clearing and stop relays. In considering the operation of the signal control circuits indicated on Fig. 3, this figure should be placed to the right of Fig. 1 with lines having corresponding reference characters in alinement.

Figure 4:
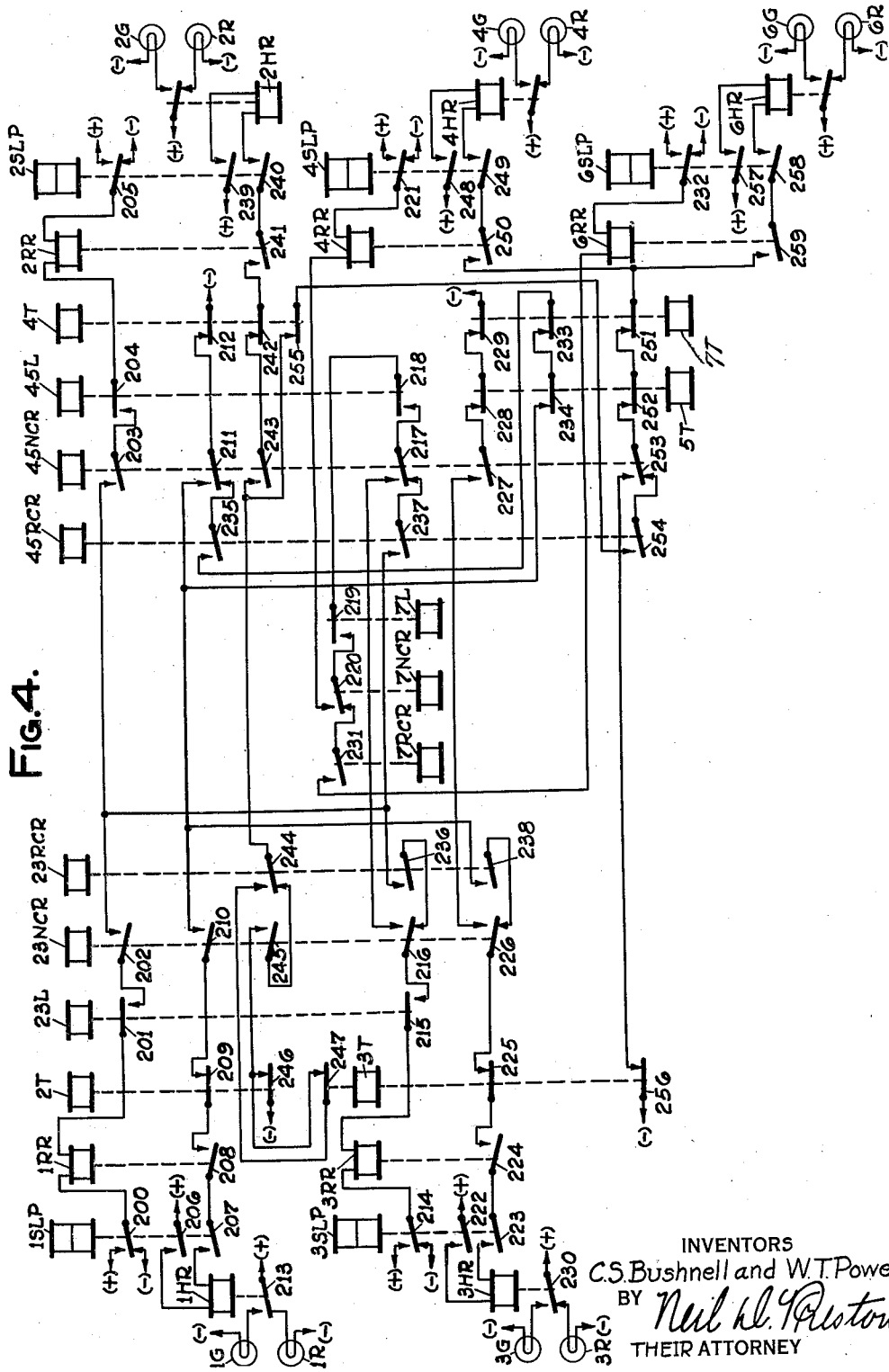

Fig. 4 illustrates the selection and control of the signals in accordance with the route established and the signal relays actuated.

Figure 5:
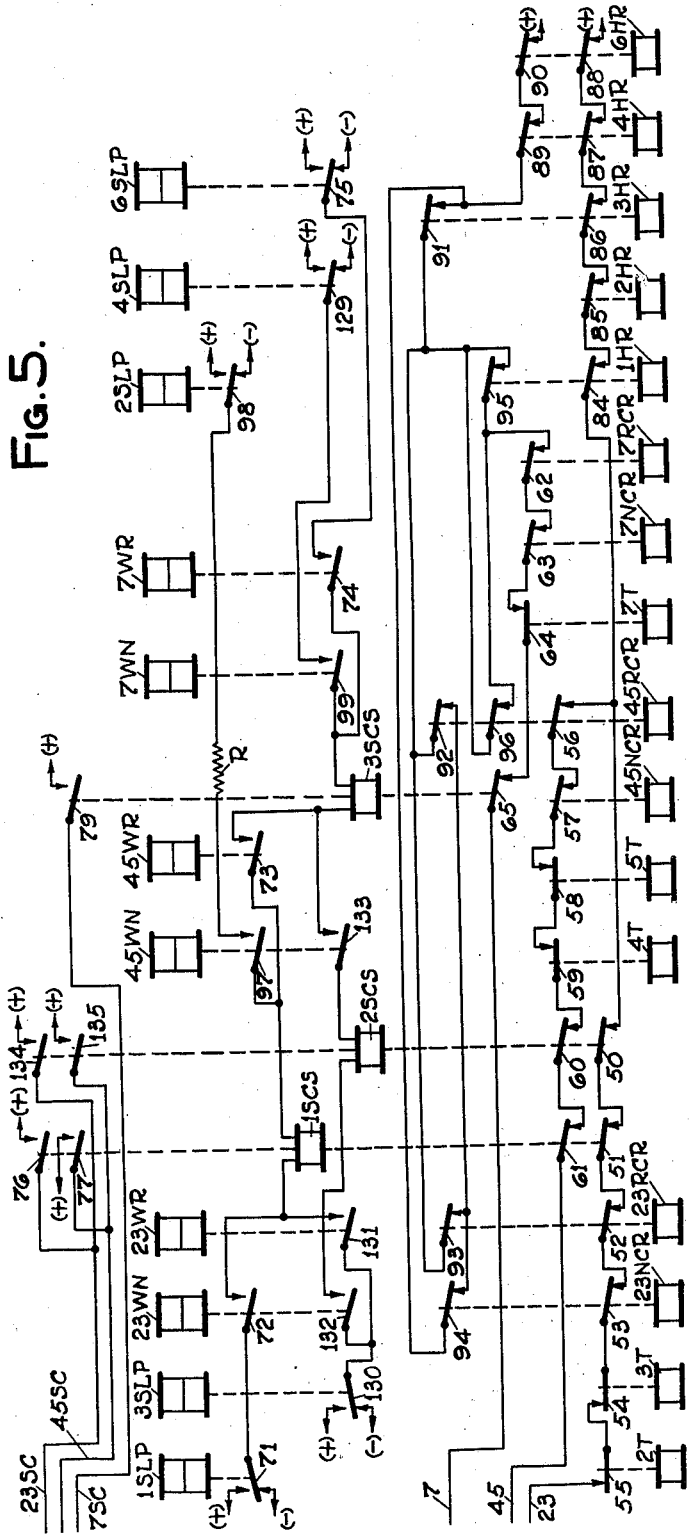

Fig. 5 illustrates the selection and control of the switch control relay stick circuits. Fig. 5 should be placed to the right of Fig. 1 with lines having corresponding reference characters in alinement. Fig. 5 also illustrates the control of the lock relays shown in Fig. 1.

Fig. 6 indicates in schematic form how the switch control stick relays of Fig. 5, together with the stick circuits for the switch control relays which are controlled by the switch control stick relays are selected and controlled in connection with a more complicated track lay-out than the one illustrated in Fig. 2. The circuits of Fig. 6 are shown in abbreviated form and are organized to function in connection with the particular track lay-out schematically indicated in Fig. 6.

For the purpose of simplifying the illustrations and facilitating in the explanation, the various parts and circuits have been shown diagrammatically and certain conventional illustrations have been employed, the drawings having been made more with the purpose of enabling a clear understanding of the principles and mode of operation to be obtained rather than with the idea of illustrating the specific construction and arrangement of parts that would be actually employed in practice. The various relays and their contacts are illustrated in a conventional manner and symbols are used to indicate the connections to the terminals of batteries or other sources of current instead of showing all of the wiring connections to these terminals.

In order to make the drawings as simple as possible the circuits of certain portions of the system have been segregated and placed on separate sheets. For example, the control circuits of the WN and WR relays are shown on Fig. 1 while the control of the correspondence relays by these WN and WR relays is shown on Fig. 2. Similarly, the control of the signal control relays is shown on Fig. 3 while the signal clearing circuits controlled by these relays are shown on Fig. 4. Likewise, the selecting circuits of the switch control stick relays which are selected by the signal relays and the switch control relays are shown on Fig. 5. Also the control of the lock relays shown on Fig. 1 is indicated in the lower portion of Fig. 5.

The symbols (+) and (—) indicate the positive and negative terminals respectively of suitable batteries or other sources of direct current and the circuits with which these symbols are used always have current flowing in the same direction.

*Communication system in general.*—For the transmission of controls a transmitting equipment is located in the control office and a receiving equipment is located at each of the various field locations. These receiving equipments are connected to the transmitting equipment by a suitable communication line circuit comprising conductors 10, 11 and 12 indicated in the upper left hand portion of Fig. 1, shown connecting the control office with the typical field station illustrated. In this portion of the drawing the three line conductors are indicated as extending to the next field station and it will be understood that this line circuit connects all of the field stations of the system to the control office. The control line is identified by the reference character 12 and it will be understood that control impulses are transmitted over this line from the control office for operating line relay F in accordance with the polarity of these impulses.

The transmission of a series of distinctive impulses over the control line circuit results in the synchronous step-by-step operation of a stepping relay bank at the control office and at each field location irrespective of the polarity of the impulses. The polarity of the impulses determines the particular field station to be selected during the first part of the operating cycle, while the polarity of the impulses during the latter part of the cycle determines the controls to be transmitted to the selected station.

*Field station equipment.*—With reference to the typical field station equipment shown in the drawings, a line repeating relay FP is indicated as being controlled by line relay F irrespective of the particular position to which relay F is actuated. Slow acting relays SA and SB are picked up in sequence at the beginning of a cycle and dropped in sequence at the end of a cycle. Stepping relays 3V, 4V and 5V are indicated as being controlled by the line repeating relay and since the detailed circuits of these stepping relays is immaterial for an understanding of the present invention, the circuits have not been shown but the control of these relays is indicated by the dotted line connections leading thereto.

Station relay SO is the relay which determines when controls are to be received at a particular field location. This relay and other similar relays at other field stations are picked up at the beginning of an operating cycle and during the cycle all of these relays are dropped except the one associated with the location to be selected. Therefore it will be assumed that after the first two steps of the cycle, relay SO of Fig. 1 will be in its picked up position so that additional impulses received will be effective to control the various devices at this location only. Relay SOP is a repeater of the station relay SO, the purpose of which will be explained in detail.

Time element relay TE has such slow acting characteristics that it remains energized during the condition of the system between successive cycles, when the cycles rapidly follow each other due to stored controls awaiting transmission. Cycle relay CY is controlled by relay TE and is for the purpose of energizing the stick circuits of the switch control relays between such successive cycles. In other words, relays TE and CY are dropped at the end of a cycle if there are no more controls coming. These relays remain up between successive cycles if there are additional controls coming and they provide means for sticking the operated switch control relays until the switch control stick relays have been selected during a succeeding cycle.

Relay $CG^1$, $CG^2$ and $CG^3$ are group or station relays and they correspond to similarly identified relays in the above mentioned Hailes et al. application, Ser. No. 526,674. Since the control of these group relays is disclosed in the above mentioned application and since it is assumed that they are controlled in the same way in the present application, it is not considered necessary to indicate their circuits in detail. It will merely be mentioned that the location and relay $CG^1$ are selected during the early part of a particular cycle, so that the following coded impulses are directed to the switch control relays. The location and relay $CG^2$ are selected during the early part of a succeeding cycle and the following coded impulses are directed to the signal control relays for the upper stretch of track illustrated in Fig. 2. The selection of the location and the operation of relay $CG^3$ is accomplished during the early part of said succeeding cycle, with the following coded impulses of this cycle directed to the signal control relays for the lower stretch of track illustrated in Fig. 2.

A first cross-over comprising track switches 2TS and 3TS has been shown controlled by switch machines 2SM and 3SM respectively. A second cross-over comprising track switches 4TS and 5TS has been shown controlled by switch machines 4SM and 5SM respectively. A turn-out track associated with the lower route comprising track switch 7TS has been shown controlled by switch machine 7SM. These switch machines are controlled by the switch machine control relays. For example, relay 23WN controls switch machines 2SM and 3SM for operating the associated track switches to their normal positions. Relay 23WR controls switch machines 2SM and 3SM for operating the associated track switches to their reverse positions. Relay 45WN controls switch machines 4SM and 5SM for operating the associated track switches to their normal positions. Relay 45WR controls switch machines 4SM and 5SM for operating the associated track switches to their reverse positions. Relays 7WN and 7WR control switch machine 7SM for operating track switch 7TS to its normal or its reverse position respectively.

Relay 23L locks switches 2 and 3, relay 45L locks switches 4 and 5 and relay 7L locks switch 7. Relay 23NCR indicates correspondence between relay 23WN and track switches 2TS and 3TS in their normal positions as repeated by relay 23WP. Relay 23RCR indicates correspondence between relay 23WR and switches 2TS and 3TS in their reverse positions as repeated by relay 23WP. Relay 45NCR indicates correspondence between relay 45WN and track switches 4TS and 5TS as repeated by switch repeating relay 45WP. Relay 45RCR indicates correspondence between relay 45WR and track switches 4TS and 5TS as repeated by relay 45WP. Relays 7NCR and 7RCR indicate correspondence between relays 7WN and track switch 7TS and relay 7WR and track switch 7TS in its normal and reverse positions respectively as repeated by relay 7WP.

Track relays 2T, 3T, 4T, 5T and 7T are the usual track relays for the corresponding insulated track sections, which indicate occupancy of these sections by dropping their contacts in the well known manner.

Referring to Figs. 3 and 4, relays 1SLP, 2SLP, 3SLP, 4SLP and 6SLP are the signal lever repeating relays which control signals 1SG, 2SG, 3SG, 4SG and 6SG respectively of Fig. 2. These signal lever repeating relays are controlled by the positions of corresponding signal levers in the control office, over the communication system in accordance with coded impulses received at the selected station, assumed to be that illustrated in the accompanying drawings. Route relays 1RR, 2RR, 3RR, 4RR and 6RR are selected in accordance with the route established by means of the signal lever repeating relays and the correspondence relays which indicate correspondence between the switch control relays and the switches controlled thereby for a particular route.

Stop relay 12S (see Fig. 3) is for the purpose of putting signals 1 and 2 to stop when selected by an appropriate code combination. Stop relay 346S is for the purpose of putting signals 3, 4 and 6 to stop when selected by an appropriate stop code. Relays 1HR, 2HR, 3HR, 4HR and 6HR (see Fig. 4) are the relays which actually control the associated signals when the associated route has been selected and it is proper for the signals to be cleared. The picking up of one of these signal relays clears the associated signal by energizing the green lamp, while the red lamp of the associated signal is energized as long as the corresponding HR relay is not picked up.

Relays 1SCS and 2SCS (see Fig. 5) are the relays which control the switch control stick circuits for relays 23WN, 23WR, 45WN and 45WR. Relay 3SCS is the relay which controls the stick circuit for switch control relays 7WN and 7WR.

It is to be understood that, although the field station has not been shown as having indication transmitting means, a complete system as contemplated in accordance with the present invention would have this feature. For the purpose of describing the present invention such feature is considered as immaterial to an understanding of the invention. It is believed that the nature of the invention, its advantages and characteristic features can best be understood with further description being set forth from the standpoint of operation.

*Operation*

*Normal conditions.* — Although the track switches TS (with appropriate preceding numerals) are usually left in their last operated positions, they all have been shown as being in their normal positions, it being assumed that the last preceding route established was over these track switches in their normal positions. With the track sections unoccupied the track relays T (with appropriate preceding numerals) are normally energized.

The switch repeating relays WP (with appropriate preceding numerals) have their neutral contacts picked up when the associated track switches are locked and their polar contacts positioned to the right when the associated track switches are in their normal positions. These polar contacts are positioned to the left when the associated switches are in their reverse positions.

Since the switch control relays WN and WR for the associated track switches are normally deenergized, the associated correspondence relays CR (with appropriate preceding numerals indicating the switches with which they are associated and preceding letters indicating the normal and reverse conditions of the associated switches) are likewise normally deenergized.

Referring to Figs. 1 and 5, a circuit for normally energizing lock relay 23L extends from (+), back contacts 88, 87, 86, 85 and 84 of relays 6HR, 4HR, 3HR, 2HR and 1HR respectively, back contact 50 of relay 2SCS, back contact 51 of relay 1SCS, back contact 52 of relay 23RCR, back contact 53 of relay 23NCR, front contact 54 of relay 3T, front contact 55 of relay 2T, conductor 23 and winding of relay 23L, to (−). A circuit for normally energizing lock relay 45L extends from (+), over the same path including contacts 88, 87, 86, 85 and 84, back contact 56 of relay 45RCR, back contact 57 of relay 45NCR, front contact 58 of relay 5T, front contact 59 of relay 4T, back contact 60 of relay 2SCS, back contact 61 of relay 1SCS, conductor 45 and winding of relay 45L, to (−). A circuit for normally energizing lock relay 7L extends from (+), back contacts 90, 89, 91 and 95 of relays 6HR, 4HR, 3HR and 1HR respectively, back contact 62 of relay 7RCR, back contact 63 of relay 7NCR, front contact 64 of relay 7T, back contact 65 of relay 3SCS, conductor 7 and winding of relay 7L, to (−).

It is contemplated that locking may be provided by connecting the lock relay circuits through front contacts of normally energized relays, such as relay M disclosed in the application of S. N. Wight, Ser. No. 689,109, filed September 12, 1933. In such an arrangement the M relay associated with a particular route is energized as long as the signals for that route are at stop. The M relay is deenergized when a signal is cleared and therefore locking can be accomplished by circuits which are normally energized over front contacts of the M relays, with the dropping of the relay locking the appropriate switch or switches by deenergizing the associated lock circuits.

It is also contemplated that approach locking and route locking may be provided if desired. Since all of these expedients form no part of the present invention, they are mentioned here only to show that they may be incorporated in the present system if required.

It will be assumed that all other relays are in their normal deenergized positions. It will also be assumed that all signals associated with the track lay-out of Fig. 2 indicate stop. This is brought about by the back contacts of the HR relays (with appropriate preceding numerals) of Fig. 4 closing normally energizing circuits for the red lamps of the associated signals.

In connection with the present disclosure it will be assumed that the location illustrated in Fig. 2 is selected and one of the three CG relays of Fig. 1 is selected and operated during the first two steps of a cycle. The following three steps are then used for the transmission of proper controls. It will be understood that it is necessary to transmit two cycles, the first of which selects the location and transmits switch controls and the second of which selects the location and transmits the signal control for signals 1 and 2 when a route is to be cleared over the upper track. When a route is to be cleared over the lower track, two cycles are required, the first of which selects the location and transmits the switch controls and the second of which selects the location and transmits the signal controls for clearing signal 3, 4 or 6. It will also be understood that more than two steps can be used for selecting the location and the CG relay in a system of larger size than that illustrated and in such event higher numbered stepping relays would be used in place of relays 3V, 4V and 5V.

The system may be initiated by the operator in the control office for the transmission of controls and the particular controls transmitted may be accomplished in the manner fully set forth in the above mentioned prior application Ser. No. 526,674. It will be assumed that the system steps through the various cycles of operations and an explanation will be given of the features and of the present embodiment, which more particularly pertains to the reception and translation of controls at a selected station after the station selecting steps have been taken.

With the possibilities of having either a positive or a negative impulse for each step of the communication system, the number of code combinations is equal to two raised to the power of the number of steps. In the present illustration three steps in each of three different cycles have been employed for controlling the switches and the signals for establishing any one of the 16 different routes possible in the track lay-out illustrated in Fig. 2.

It is believed that the invention will be more easily explained and more readily understood if the various cycles and code combinations for the various steps of the cycles, together with the uses of these code combinations are set forth in a code table. The following code table is one which may be used to accomplish all of the desired functions in connection with the present embodiment and it will be understood that this table may be varied in the combinations set up without departing from the spirit of the present invention.

*Code table*

| Code No. | Cycle No. | Step 3 | Step 4 | Step 5 | Code use |
|---|---|---|---|---|---|
| 1 | 1 | + | + | + | 23N, 45N, 7N |
| 2 | 1 | + | + | − | 23N, 45N, 7R |
| 3 | 1 | + | − | + | 23N, 45R, 7N |
| 4 | 1 | + | − | − | 23N, 45R, 7R |
| 5 | 1 | − | + | + | 23R, 45N, 7N |
| 6 | 1 | − | + | − | 23R, 45N, 7R |
| 7 | 1 | − | − | + | 23R, 45R, 7N |
| 8 | 1 | − | − | − | 23R, 45R, 7R |
| 9 | 2 | + | + | + | Not used |
| 10 | 2 | + | + | − | Not used |
| 11 | 2 | + | − | + | Clear sig. 2 |
| 12 | 2 | + | − | − | Clear sig. 2 |
| 13 | 2 | − | + | + | Clear sig. 1 |
| 14 | 2 | − | + | − | Clear sig. 1 |
| 15 | 2 | − | − | + | Stop sig. 1–2 |
| 16 | 2 | − | − | − | Stop sig. 1–2 |
| 17 | 3 | + | + | + | Not used |
| 18 | 3 | + | + | − | Not used |
| 19 | 3 | + | − | + | Clear sig. 4 |
| 20 | 3 | + | − | − | Clear sig. 4 |
| 21 | 3 | − | + | + | Clear sig. 3 |
| 22 | 3 | − | + | − | Clear sig. 3 |
| 23 | 3 | − | − | + | Clear sig. 6 |
| 24 | 3 | − | − | − | Stop sig. 3–4–6 |

The codes associated with step 5 of the 2nd cycle are not used. In the last column, N and R indicate that the associated track switches are actuated to normal and reverse respectively. For example, 23N, 45N, 7N indicate switches 2, 3, 4, 5 and 7 actuated to their normal positions.

It will be understood that the three cycles in the above table do not mean three successive cycles of operation. Cycle 1 refers to a switch control cycle. Cycle 2 refers to a signal control cycle for signals 1SG and 2SG (relay CG² up). Cycle 3 refers to a signal control cycle for signals 3SG, 4SG and 6SG (relay CG³ up).

*Establishing a route.*—With the system in the normal conditions above outlined, the operator may govern the track switches to such new positions as he may desire (see Fig. 2). For example, the operation of relay 23WR in response to a (—) impulse on the third step of the first cycle is effective to actuate switch machines 2SM and 3SM for positioning the associated track switches to their reverse positions. The control circuits of the WN and WR relays for operating the associated switch machines have been merely indicated by dotted lines extending from the brackets associated with the WN and WR relays to the corresponding switch machines. Such control may be accomplished in any approved manner such, for example, as in the prior application of T. J. Judge, Ser. No. 712,920, filed February 26, 1934.

Referring to Fig. 1 and assuming that the operator desires to operate switches 2TS, 3TS, 4TS, 5TS and 7TS to their normal positions, the No. 1 code (+)(+)(+) will be transmitted. At the beginning of the cycle the picking up of line relay F closes a circuit from (+), contact 1 of relay F in either position and winding of relay FP to (—), which picks up relay FP for closing a pick up circuit for relay SA which extends from (+), front contact 2 of relay FP and winding of relay SA, to (—). Relay SA closes a circuit from (+) at its front contact 3 and the winding of relay SB for energizing relay SB. During the steps of the cycle the closure of back contact 2 of relay FP completes a circuit from (+), through front contact 4 of relay SA for picking up the stepping relays in sequential order.

It will now be assumed that relay CG¹ is picked up during the station selecting steps of the cycle and that the operator transmits the first code (+)(+)(+) in the above code table. The (+) impulse at step 3 closes a circuit for picking up relay 23WN which extends from (+), front contact 5 of relay SO, contact 6 of relay F in its right hand dotted position, back contact 8 of relay 5V, back contact 18 of relay 4V, front contact 28 of relay 3V, bus (3+), front contact 13 of relay CG¹, conductor (SW3+), lower winding of relay 23WN and front contact 14 of relay 23L, to (—). The picking up of relay 23WN actuates switches 2TS and 3TS to their normal positions.

The (+) impulse on step 4 closes a circuit for picking up relay 45WN which extends from (+), front contact 5 of relay SO, contact 6 of relay F in its right hand dotted position, back contact 8 of relay 5V, front contact 18 of relay 4V, (4+) bus, front contact 15 of relay CG¹, conductor (SW4+), lower winding of relay 45WN and front contact 16 of relay 45L, to (—).

The (+) on step 5 closes a circuit for picking up relay 7WN which extends from (+), front contact 5 of relay SO, contact 6 of relay F in its right hand dotted position, front contact 8 of relay 5V, (5+) bus, front contact 17 of relay CG¹, conductor (SW5+), lower winding of relay 7WN and front contact 20 of relay 7L, to (—). With relays 23WN, 45WN and 7WN picked up track switches 2TS, 3TS, 4TS, 5TS and 7TS are actuated to their normal positions.

The reception of the second code (+)(+)(—) picks up relays 23WN and 45WN on steps 3 and 4 as above described. The (—) impulse on step 5 closes a circuit for picking up relay 7WR which extends from (+), front contact 5 of relay SO, contact 6 of relay F in its left hand dotted position, front contact 9 of relay 5V, (5—) bus, front contact 21 of relay CG¹, conductor (SW5—), lower winding of relay 7WR and front contact 20 of relay 7L, to (—). With relays 23WN, 45WN and 7WR picked up switches 2TS, 3TS, 4TS and 5TS are actuated to their normal positions and switch 7TS is actuated to its reverse position.

*Code No. 3.*—The reception of the (+) impulse on step 3 picks up relay 23WN as previously described and the reception of the (+) impulse on step 5 picks up relay 7WN as previously described. The reception of the (—) impulse on step 4 picks up relay 45WR over a circuit extending from (+), front contact 5 of relay SO, contact 6 of relay F in its left hand dotted position, back contact 9 of relay 5V, front contact 19 of relay 4V, bus (4—), front contact 22 of relay CG¹, conductor (SW4—), lower winding of relay 45WR and front contact 16 of relay 45L, to (—). With relays 23WN and 7WN picked up, switches 2TS, 3TS and 7TS are actuated to their normal positions and with relay 45WR picked up, switches 4TS and 5TS are actuated to their reverse positions.

*Code No. 4.*—The (+) impulse on step 3 picks up relay 23WN for actuating switches 2TS and 3TS to their normal positions. The (—) impulses on steps 4 and 5 pick up relays 45WR and 7WR for actuating track switches 4TS, 5TS and 7TS to their reverse positions.

*Code No. 5.*—The (—) impulse on step 3 picks up relay 23WR for actuating switches 2TS and 3TS to their reverse positions. The (+) impulses on steps 4 and 5 pick up relays 45WN and 7WN for actuating switches 4TS, 5TS and 7TS to their normal positions.

*Code No. 6.*—The (—) impulses on steps 3 and 5 pick up relays 23WR and 7WR for actuating switches 2TS, 3TS and 7TS to their reverse positions. The (+) impulse on step 4 picks up relay 45WN for actuating switches 4TS and 5TS to their normal positions.

*Code No. 7.*—The (—) impulses on steps 3 and 4 pick up relays 23WR and 45WR for actuating switches 2TS, 3TS, 4TS and 5TS to their reverse positions. The (+) impulse on step 5 picks up relay 7WN for actuating switch 7TS to its normal position.

*Code No. 8.*—The (—) impulses on steps 3, 4 and 5 pick up relays 23WR, 45WR and 7WR for actuating switches 2TS, 3TS, 4TS, 5TS and 7TS to their reverse positions.

Upon the reception of any one of the above eight code combinations for conditioning the switch control relays, relay CG¹ and the other relays of Fig. 1 to the left of relay CG¹ (except relays TE and CY) are dropped at the end of the cycle in a manner which is disclosed in the above mentioned prior application, Ser. No. 526,674.

At the beginning of the above described cycle a circuit is closed for picking up relay SOP extending from (+), front contact 24 of relay SO and lower winding of relay SOP to (—). Relay SOP closes a circuit at its front contact 26 for picking up relay TE. Relay SOP closes a stick circuit for itself extending from (+), front contact 30 of relay SB, front contact 32 and upper winding of relay SOP, to (—). After the station is selected a circuit is closed for picking up relay CY which extends from (+), front contact 24 of relay SO, lower winding of relay CY and front contact 25 of relay CG¹, to (—).

At the end of the cycle, the dropping of relays SO and SB opens the pick up and stick circuits respectively of relay SOP and this relay drops to deenergize relay TE, but due to its slow acting characteristics relay TE maintains its front contact 27 closed to keep relay CY energized during the period of blank between successive cycles when this period of blank is of comparatively short duration due to the fact that another cycle is to immediately follow. This maintains relay CY picked up which applies (+) potential to the three stick circuits leading to the three sets of WN and WR relays. The stick circuit for relay CY extends from (+), front contact 27 of relay TE, front contact 31 and upper winding of relay CY, to (—).

When relay 23WN is picked up it is stuck up during the switch control cycle and the following cycle, when signal controls are received, over a circuit extending from (+), front contact 33 of relay CY, back contact 34 of relay 23WR, front contact 35 and upper winding of relay 23WN, to (—). If relay 23WR is picked up, then this stick circuit is completed through back contact 35 of relay 23WN, front contact 34 and upper winding of relay 23WR, to (—). With relay 45WN picked up a stick circuit is provided which extends from (+), front contact 36 of relay CY, back contact 38 of relay 45WR, front contact 39 and upper winding of relay 45WN, to (—). With relay 45WR picked up this stick circuit extends through back contact 39 of relay 45WN, front contact 38 and upper winding of relay 45WR, to (—). When relay 7WN is picked up a stick circuit is established from (+), front contact 37 of relay CY, back contact 40 of relay 7WR, front contact 41 and upper winding of relay 7WN, to (—). With relay 7WR picked up the above described stick circuit is completed through back contact 41 of relay 7WN, front contact 40 and upper winding of relay 7WR, to (—).

It will be understood that the invention preferably operates in connection with a centralized traffic controlling system of the type in which relay SO is not picked up during a cycle in which indications alone are transmitted. In this way the unnecessary operation of relays SOP, TE and CY is prevented during indication cycles and since relay SO is picked up only during control cycles, the stick circuits for the switch control relays are maintained energized between successive cycles only when a previous cycle was one for the transmission of controls.

It will be understood that relay TE can be of any suitable type such, for example, as a thermal relay having the proper time constants for maintaining the stick circuit of relay CY energized during the maximum time interval between any two successive cycles of the system.

From the above description it will be seen that, with any one or more of the switch control relays picked up, a stick circuit is provided for each relay which is effective to maintain this relay in its picked up position between cycles which follow each other in rapid succession. This is due to the hold over function of relays TE and CY for applying potential to these stick circuits. If a switch control relay is picked up during a cycle and another cycle for the transmission of associated switch or signal controls does not immediately follow, then of course the time element relay TE has time to drop during the period of blank and the switch control relays are restored to their normal positions.

With relay 23WN picked up and with track switches 2TS and 3TS in their normal positions a circuit is closed for picking up correspondence relay 23NCR (see Fig. 2) which extends from (+), contact 42 of relay 23WP in its right hand position, front contact 43 of relay 23WP, back contact 44 of relay 23WR, front contact 46 of relay 23WN and winding of relay 23NCR to (—). With relay 23WR picked up and with the associated track switches in their reverse positions a circuit is closed for picking up relay 23RCR extending from (+), front contact 44 of relay 23WR, front contact 43 of relay 23WP, contact 42 of relay WP in its left hand dotted position and winding of relay 23RCR, to (—).

With relay 45WN picked up and with switches 4TS and 5TS in their normal positions a circuit is closed for picking up relay 45NCR which extends from (+), contact 47 of relay 45WP in its right hand position, front contact 48 of relay 45WP, back contact 49 of relay 45WR, front contact 69 of relay 45WN and winding of relay 45NCR, to (—). With relay 45WR picked up and the associated track switches in their reverse positions a circuit is closed for picking up relay 45RCR which extends from (+), front contact 49 of relay 45WR, front contact 48 of relay 45WP, contact 47 of relay 45WP in its left hand dotted position and winding of relay 45RCR, to (—).

With relay 7WN picked up and with track switch 7TS in its normal position a circuit is closed for picking up relay 7NCR which extends from (+), contact 66 of relay 7WP in its right hand position, front contact 67 of relay 7WP, back contact 68 of relay 7WR, front contact 78 of relay 7WN and winding of relay 7NCR, to (—). With relay 7WR picked up and with track switch 7TS in its reverse position a circuit is closed for picking up relay 7RCR which extends from (+), front contact 68 of relay 7WR, front contact 67 of relay 7WP, contact 66 of relay 7WP in its left hand dotted position and winding of relay 7RCR, to (—).

From the above description it will be apparent that after the reception of the switch control codes on the first cycle, with relay CG¹ of Fig. 1 picked up, the particular switch control relays (WN and WR with suitable preceding numerals) which are picked up during this cycle are stuck up during the next cycle when signal controls are transmitted, because relay CY remains up between such successive cycles to maintain the stick circuits of the switch control relays energized. At the termination of the signal control cycle the particular switch control relays which were picked up will then be stuck up in accordance with the signal clearing circuits as will be later described. It will also be understood that the CY relay functions in a similar manner in a large system where there may be two switch control cycles.

With a particular mechanical set up of the track switches in response to switch control code impulses as above described two routes may be set up thereover. In other words, a route is considered as involving the direction in which a train is allowed to pass over the track way. With the particular track layout and signalling arrangement illustrated in Fig. 2, which has been chosen as a typical example of a means for practicing the present invention, 16 different routes may be established as tabulated in the following route table. In this table the direction of the route is to be considered from the signal first named to the signal last named.

*Route table*

|   |         |     |           |                                            |
|---|---------|-----|-----------|--------------------------------------------|
| 1 | signal  | 1SG | to signal | 2SG                                        |
| 2 | signal  | 1SG | to signal | 4SG                                        |
| 3 | signal  | 1SG | to signal | 6SG                                        |
| 4 | signal  | 3SG | to signal | 2SG                                        |
| 5 | signal  | 3SG | to signal | 4SG                                        |
| 6 | signal  | 3SG | to signal | 6SG                                        |
| 7 | signal  | 2SG | to signal | 1SG                                        |
| 8 | signal  | 2SG | to signal | 3SG                                        |
| 9 | signal  | 4SG | to signal | 1SG                                        |
| 10| signal  | 4SG | to signal | 3SG                                        |
| 11| signal  | 6SG | to signal | 1SG                                        |
| 12| signal  | 6SG | to signal | 3SG                                        |
| 13| signal  | 3SG over both cross-overs to signal 4SG |
| 14| signal  | 3SG over both cross-overs to signal 6SG |
| 15| signal  | 4SG over both cross-overs to signal 3SG |
| 16| signal  | 6SG over both cross-overs to signal 3SG |

Although a large number of routes can be set up over the track lay-out illustrated, it is considered sufficient for an understanding of the present invention to explain in detail only the establishment of a single route and thereafter to briefly explain the establishment of additional routes.

For example, it will be assumed that the operator desires to set up a route for the passage of a train in an east bound direction from signal 1SG to signal 6SG. To do this the operator positions the switch machine lever in the control office which controls relays 23WN and 23WR to a normal position and the switch machine control levers which control relays 45WN, 45WR, 7WN and 7WR to reverse positions. The signal control lever is then placed in the position for clearing signal 1SG, after which the starting button is actuated to initiate the system into its cycle of operations.

Track switches 2TS and 3TS are actuated to their normal positions and track switches 4TS, 5TS and 7TS are actuated to their reverse positions in the manner previously described. After these switches have reached these particular positions correspondence relays 23NCR, 45RCR and 7RCR are actuated in the manner previously described.

The system now steps through its second cycle and it will be assumed that the impulses transmitted during steps 3, 4 and 5 of this cycle are (−) (+) (+) which corresponds to code number 13 of the above code table. It will be noted by referring to this code table and by referring to Fig. 1 that the (+) impulse on step 5 is not used. It will also be understood that relay CG² is picked up during this second cycle in a manner described in the above mentioned prior application, Ser. No. 526,674.

The (−) impulse on step 3 is ineffective since it is assumed that front contact 100 of relay 2SLP (see Fig. 3) is open. The (+) impulse on step 4 closes a circuit for picking up relay 1SLP extending from (+), front contact 5 of relay SO, contact 6 of relay F in its right hand dotted position, back contact 8 of relay 5V, front contact 18 of relay 4V, (4+) bus, front contact 70 of relay CG², conductor (12SG4+), back contact 101 of relay 2SLP, lower winding of relay 1SLP and back contact 102 of relay 1RR, to (−). Relay 1SLP closes a stick circuit for itself extending from (+), back contact 103 of relay 12S, front contact 104 of relay 2T, front contact 105 and upper winding of relay 1SLP, to (−). The picking up of back contact 106 of relay 1SLP opens the pick up circuit of relay 2SLP as an interlock to prevent this relay being operated while relay 1SLP is picked up.

Recalling that relay 23NCR was picked up when switches 2TS and 3TS were properly positioned and referring to Figs. 1 and 5, it will be observed that the picking up of back contact 53 of relay 23NCR deenergizes lock relay 23L which, at its front contact 14, opens the pick up circuits of relays 23WN and 23WR so that no change in the position of these switch control relays can take place as long as they are locked by relay 23L. As previously mentioned, relay 23L when deenergized also locks switches 2TS and 3TS against further operation.

Also recalling that relay 45RCR was picked up when track switches 4TS and 5TS were properly positioned, it will be observed that the picking up of back contact 56 of relay 45RCR deenergizes and drops lock relay 45L which locks the control relays for switches 4TS and 5TS and also locks the switches against any change in position. Likewise, the picking up of relay 7RCR when switch 7TS is properly positioned deenergizes lock relay 7L at back contact 62 of relay 7RCR. This likewise locks switch 7TS and its control relays against any change in condition.

Referring to Fig. 4, the picking up of relay 1SLP closes a circuit for picking up relays 1RR and 6RR which extends from (+), front contact 200 of relay 1SLP, winding of relay 1RR, back contact 201 of relay 23L, front contact 202 of relay 23NCR, front contact 237 of relay 45RCR, back contact 217 of relay 45NCR, back contacts 218 and 219 of relays 45L and 7L, back contact 220 of relay 7NCR, front contact 231 of relay 7RCR, winding of relay 6RR and back contact 232 of relay 6SLP, to (−).

The picking up of relay 6RR over this circuit serves to open the pick-up circuit of relay 6SLP at back contact 118 (see Fig. 3) as a check against relay 6SLP being picked up when signal 1SG is cleared under the above condition. The picking up of relays 1SLP and 1RR closes a circuit for the signal relay 1HR (see Fig. 4) which extends from (+), front contact 206 of relay 1SLP, winding of relay 1HR, front contact 207 of relay 1SLP, front contact 208 of relay 1RR, front contact 209 of relay 2T, front contact 210 of relay 23NCR, front contacts 234 and 233 of relays 5T and 7T respectively, front contact 235 of relay 45RCR, back contact 211 of relay 45NCR and front contact 212 of relay 4T, to (−). The picking up of contact 213 of relay 1HR clears signal 1SG by deenergizing red lamp 1R and lighting green lamp 1G.

As soon as the train enters the route by occupying the track section with which relay 2T is associated, this relay is deenergized which opens the stick circuit of relay 1SLP at front contact 104 (see Fig. 3) so that relay 1SLP is restored to its normal position. The dropping of front contact 209 (see Fig. 4) of relay 2T, as well as the dropping of front contacts 206 and 207 of relay 1SLP, deenergizes relay 1HR which puts signal 1SG to stop. The dropping of front contact 55 of relay 2T (see Fig. 5) maintains the circuit of relay 23L open as long as this track section is occupied to lock the control relays against any change in condition.

Referring to Fig. 5, a circuit is established for picking up relays 1SCS and 3SCS when switch control relays 23WN, 45WR and 7WR are picked up at the time relay 1SLP is picked up to prepare the proper signal clearing circuit. This circuit extends from (+), front contact 71 of relay 1SLP, front contact 72 of relay 23WN, winding of relay 1SCS, front contact 73 of relay 45WR, winding of relay 3SCS, front contact 74 of relay 7WR and back contact 75 of relay 6SLP, to (—). Relay 1SCS closes a stick circuit for sticking relay 23WN which extends from (+), front contact 76 of relay 1SCS, conductor 23SC, front contact 35 and upper winding of relay 23WN, to (—). This relay also provides a stick circuit for sticking relay 45WR which extends from (+), front contact 77 of relay 1SCS, conductor 45SC, front contact 38 and upper winding of relay 45WR, to (—). Relay 3SCS closes a stick circuit for relay 7WR which extends from (+), front contact 79 of relay 3SCS, conductor 7SC, front contact 40 and upper winding of relay 7WR, to (—).

It will be observed that these stick circuits are effective to stick the switch control relay which was picked up. In other words, if relay 23WR was picked up the above described stick circuit would be completed through its front contact 34, if relay 45WN was picked up its stick circuit would be completed through front contact 39 and if relay 7WN was picked up its stick circuit would be completed through front contact 41. It will be realized that these stick circuits for the switch control relays made up when the signal clearing circuit is prepared, is necessary to keep the switch control relays energized in order that the correspondence relays may remain energized, since the signal clearing circuits (see Fig. 4) are dependent upon the energization of the proper correspondence relays.

*Establishing other routes.*—The above description points out in detail the manner in which route No. 3 is established over the trackway and cleared to allow the passage of a train, together with various detailed operations involved. The setting up of the remaining routes with their detailed operations may be readily understood by analogy to the above description. However, it is thought expedient to point out in general the other route selecting and signal clearing circuits under various combinations of circumstances and practice. These circuits will be pointed out, without any attempt to explain all of the circumstances and operations involved in a system such as illustrated in the present drawings.

*Route No. 1.*—The operator actuates the proper control levers for transmitting the switch control code for picking up relays 23WN and 45WN which actuate switches 2TS, 3TS, 4TS and 5TS to their normal positions. Relays 23NCR and 45NCR are energized to indicate correspondence between these control impulses and the response of the switches, all of which has been previously pointed out. Relay 1SLP is picked up over the previously described circuit by means of a (+) impulse on the fourth step of the second cycle and this relay is stuck up.

The route selecting circuit is completed when lock relays 23L and 45L are dropped by the picking up of contacts 53 and 57 of relays 23NCR and 45NCR respectively. This circuit extends from (+), front contact 200 of relay 1SLP, winding of relay 1RR, back contact 201 of relay 23L, front contact 202 of relay 23NCR, front contact 203 of relay 45NCR, back contact 204 of relay 45L, winding of relay 2RR and back contact 205 of relay 2SLP, to (—). The signal clearing circuit for signal 1SG is completed by the picking up of relay 1HR over a circuit extending from (+), front contact 206 of relay 1SLP, winding of relay 1HR, front contact 207 of relay 1SLP, front contact 208 of relay 1RR, front contact 209 of relay 2T, front contact 210 of relay 23NCR, front contact 211 of relay 45NCR and front contact 212 of relay 4T, to (—).

*Route No. 2.*—Since track switches 2TS and 7TS must be in their normal positions and track switches 4TS and 5TS must be in their reverse positions, a switch control code is transmitted for picking up relays 23WN, 45WR and 7WN. This will be Code No. 3 of the code table. When correspondence is attained relays 23NCR, 45RCR and 7NCR are picked up. The picking up of back contacts 53 of relay 23NCR, 56 of relay 45RCR and 63 of relay 7NCR drops lock relays 23L, 45L and 7L respectively. Code No. 13 is now transmitted for picking up relay 1SLP as before.

The route selecting circuit is now completed for picking up relays 1RR and 4RR extending from (+), front contact 200 of relay 1SLP, winding of relay 1RR, back contact 201 of relay 23L, front contact 202 of relay 23NCR, front contact 237 of relay 45RCR, back contact 217 of relay 45NCR, back contact 218 of relay 45L, back contact 219 of relay 7L, front contact 220 of relay 7NCR, winding of relay 4RR and back contact 221 of relay 4SLP, to (—). The signal clearing circuit is now completed for picking up relay 1HR to clear signal 1SG and extends from (+), front contact 206 of relay 1SLP, winding of relay 1HR, front contact 207 of relay 1SLP, front contact 208 of relay 1RR, front contact 209 of relay 2T, front contact 210 of relay 23NCR, front contacts 234 and 233 of relays 5T and 7T respectively, front contact 235 of relay 45RCR, back contact 211 of relay 45NCR and front contact 212 of relay 4T, to (—).

*Route No. 3.*—Has been explained in detail.

*Route No. 4.*—Relays 23WR and 45WN are picked up by the proper code combination and after switches 2TS and 3TS are in their reverse positions and switches 4TS and 5TS are in their normal positions, correspondence relays 23RCR and 45NCR are picked up. Code No. 21 is transmitted for sending a (+) impulse on the fourth step of the third cycle, which picks up relay 3SLP over a circuit extending from (+), front contact 5 of relay SO, contact 6 of relay F in its right hand dotted position, back contact 8 of relay 5V, front contact 18 of relay 4V, (4+) bus, front contact 80 of relay CG³, conductor (346SG4+), back contacts 109 and 110 of relays 4SLP and 6SLP respectively, lower winding of relay 3SLP, and back contact 111 of relay 3RR, to (—). Relay 3SLP is stuck up over a circuit extending from (+), back contact 112 of relay 346S, front contact 113 of relay 3T, front contact 114 and upper winding of relay 3SLP, to (—).

The route selecting circuit is established for picking up relays 3RR and 2RR when lock relays 23L and 45L drop their contacts 215 and 204 respectively. This circuit extends from (+), front contact 214 of relay 3SLP, winding of relay 3RR, back contact 215 of relay 23L, back contact 216 of relay 23NCR, front contact 236 of relay 23RCR, front contact 203 of relay 45NCR, back contact 204 of relay 45L, winding of relay 2RR and back contact 205 of relay 2SLP, to (—). Relay 3HR is picked up to clear signal 3SG over a circuit extending through front contacts 222 and 223 of relay 3SLP, front contacts 224 and 225 of relays 3RR and 3T, back contact 226 of relay 23NCR, front contact 238 of relay 23RCR, front contacts 211 and 212 of relays 45NCR and 4T, to (—).

*Route No. 5.*—Relays 23WN, 45WN and 7WN are picked up by the switch control code, after which relays 23NCR, 45NCR and 7NCR are picked up. Relay 3SLP is picked up by a (+) impulse on the fourth step of the third cycle (code No. 21) and this relay is stuck up as before. Relays 3RR and 4RR are now energized when lock relays 23L, 45L and 7L are dropped by the picking up of correspondence relays 23NCR, 45NCR and 7NCR. This circuit extends from (+), front contact 214 of relay 3SLP, winding of relay 3RR, back contact 215 of relay 23L, front contact 216 of relay 23NCR, front contact 217 of relay 45NCR, back contact 218 of relay 45L, back contact 219 of relay 7L, front contact 220 of relay 7NCR, winding of relay 4RR and back contact 221 of relay 4SLP, to (—). Relay 3HR is picked up to clear signal 3SG over a circuit extending through front contacts 222 and 223 of relay 3SLP and front contacts 224, 225, 226, 227, 228 and 229 of relays 3RR, 3T, 23NCR, 45NCR, 5T and 7T respectively.

*Route No. 6.*—Relays 23WN, 45WN and 7WR are picked up, after which correspondence relays 23NCR, 45NCR and 7RCR are picked up. The picking up of these three correspondence relays drops lock relays 23L, 45L and 7L. A (+) impulse on the fourth step of the third cycle (code No. 21) is effective to pick up relay 3SLP and it is stuck up as previously described. Relays 3RR and 6RR are now picked up over a circuit extending from (+), front contact 214 of relay 3SLP, winding of relay 3RR, back contact 215 of relay 23L, front contacts 216 and 217 of relays 23NCR and 45NCR, back contacts 218 and 219 of relays 45L and 7L, back contact 220 of relay 7NCR, front contact 231 of relay 7RCR, winding of relay 6RR and back contact 232 of relay 6SLP, to (—). Relay 3HR is picked up to clear signal 3SG over a circuit including front contacts 222 and 223 of relay 3SLP, front contacts 224, 225, 226, 227, 228 and 229 of relays 3RR, 3T, 23NCR, 45NCR, 5T and 7T respectively.

*Route No. 7.*—This is a code for clearing signal 2SG over the same route but in a reverse direction as explained in connection with route No. 1. The same switch control, correspondence and route relays will be picked up as described in connection with route No. 1. Relay 2SLP will be picked up by a (+) impulse on the third step of the second cycle (code No. 11) over a circuit extending from (+), front contact 5 of relay SO, contact 6 of relay F in its right hand dotted position, back contacts 8 and 18 of relays 5V and 4V, front contact 28 of relay 3V, (3+) bus, front contact 81 of relay CG², conductor (12SG3+), back contact 106 of relay 1SLP, lower winding of relay 2SLP and back contact 107 of relay 2RR, to (—). Relay 2HR is picked up to clear signal 2SG over a circuit extending from (+), front contact 239 of relay 2SLP, winding of relay 2HR, front contact 240 of relay 2SLP, front contact 241 of relay 2RR, front contact 242 of relay 4T, front contact 243 of relay 45NCR, back contact 244 of relay 23RCR, front contact 245 of relay 23NCR and front contact 246 of relay 2T, to (—).

*Route No. 8.*—This is a route in reverse to that described in connection with route No. 4 with the same switch control, correspondence and route relays picked up. Relay 2SLP, however, is picked up this time by the previously described (+) impulse on the third step of the second cycle (code No. 11). Relay 2HR is picked up to clear signal 2SG over the same circuit described in connection with code No. 7 to contact 244 of relay 23RCR, the circuit this time being completed through front contact 244 of relay 23RCR, front contact 247 of relay 3T and front contact 246 of relay 2T, to (—).

*Route No. 9.*—This is the reverse of code No. 2 with the same switch control, correspondence and route relays picked up. Relay 4SLP is picked up in this instance by a (+) impulse on the third step of the third cycle (code No. 19) over a circuit extending from (+), front contact 5 of relay SO, contact 6 of relay F in its right hand dotted position, back contacts 8 and 18 of relays 5V and 4V, front contact 28 of relay 3V, (bus 3+), front contact 82 of relay CG³, conductor (346SG3+), back contacts 115 and 119 of relays 3SLP and 6SLP respectively, lower winding of relay 4SLP and back contact 117 of relay 4RR, to (—). Relay 4HR is picked up to clear signal 4SG over a circuit extending from (+), front contact 248 of relay 4SLP, winding of relay 4HR, front contacts 249, 250, 251 and 252 of relays 4SLP, 4RR, 7T and 5T, back contact 253 of relay 45NCR, front contact 254 of relay 45RCR, front contact 255 of relay 4T, back contact 244 of relay 23RCR, front contacts 245 and 246 of relays 23NCR and 2T, to (—).

*Route No. 10.*—This is the reverse of code No. 5 with the same switch control, correspondence and route relays picked up. Relay 4SLP is picked up over the previously described circuit by a (+) impulse on the third step of the third cycle (code No. 19). Relay 4HR is picked up to clear signal 4SG over the same circuit described in connection with code No. 9 up to contact 253 of relay 45NCR, with the circuit now extending through front contact 253 of relay 45NCR and front contact 256 of relay 3T, to (—).

*Route No. 11.*—This is the reverse of code No. 3 with the same switch control, correspondence and route relays picked up. Relay 6SLP is picked up in this instance by a (+) impulse on the fifth step of the third cycle (code No. 23) over a circuit extending from (+), front contact 5 of relay SO, contact 6 of relay F in its right hand dotted position, front contact 8 of relay 5V, (5+ bus), front contact 83 of relay CG³, conductor (346SG5+), back contacts 116 and 120 of relays 3SLP and 4SLP, lower winding of relay 6SLP and back contact 118 of relay 6RR, to (—). Relay 6HR is picked up to clear signal 6SG over a circuit extending from (+), front contact 257 of relay 6SLP, winding of relay 6HR, front contact 258 of relay 6SLP, front contact 259 of relay 6RR, front contacts 251 and 252 of relays 7T and 5T, back contact 253 of relay 45NCR, front contacts 254 and 255 of relays 45RCR and 4T, back contact 244 of relay 23RCR, front contacts 245 and 246 of relays 23NCR and 2T, to (—).

*Route No. 12.*—This is the reverse of code No. 6 with the same switch control, correspondence and route relays picked up. Relay 6SLP is picked up by a (+) impulse on the fifth step of the third cycle (code No. 23) as described in connection with code No. 11. Relay 6HR is picked up to clear signal 6SG over the same circuit described in connection with code No. 11 up to contact 253 of relay 45NCR and in this instance the circuit extends through front contact 253 of relay 45NCR and front contact 256 of relay 3T, to (—).

*Route No. 13.*—Since this code requires track switches 2TS, 3TS, 4TS and 5TS in their reverse positions for establishing the route over both cross-overs and since track switch 7TS must be in its normal position, relays 23WR, 45WR and 7WN will be selected over the previously described switch control selecting circuits. Correspondence relays 23RCR, 45RCR and 7NCR will be actuated when these track switches are properly positioned. Relay 3SLP will be picked up by a (+) impulse on the fourth step of the third cycle (code No. 21) over the previously described circuit.

Relays 3RR and 4RR will be picked up over a circuit extending through front contact 214 of relay 3SLP, winding of relay 3RR, back contact 215 of relay 23L, back contact 216 of relay 23NCR, front contact 236 of relay 23RCR, front contact 237 of relay 45RCR, back contacts 217, 218 and 219 of relays 45NCR, 45L and 7L, front contact 220 of relay 7NCR, winding of relay 4RR and back contact 221 of relay 4SLP, to (—). Relay 3HR is picked up to clear signal 3SG over a circuit extending through front contacts 222, 223, 224 and 225 of relays 3SLP, 3RR and 3T, back contact 226 of relay 23NCR, front contact 238 of relay 23RCR, front contacts 234, 233 and 235 of relays 5T, 7T and 45RCR, back contact 211 of relay 45NCR and front contact 212 of relay 4T, to (—).

*Route No. 14.*—Since this is the same route as No. 13 except that it is by way of track switch 7TS in its reverse instead of its normal position, relays 23WR, 45WR, 7WR, 23RCR, 45RCR and 7RCR will be picked up in response to the switch control code and the positioning of the track switches. Relay 3SLP is picked up by the (+) impulse on the fourth step of the third cycle as before (code No. 21). Relays 3RR and 6RR are picked up over the same circuit described in connection with code No. 13 up to contact 220 of relay 7NCR and in this instance it extends through back contact 220 of relay 7NCR, front contact 231 of relay 7RCR, winding of relay 6RR and back contact 232 of relay 6SLP, to (—). Relay 3HR is picked up to clear signal 3SG over the same circuit described in connection with code No. 13.

*Route No. 15.*—This is the reverse of code No. 13 with the same switch control, correspondence and route relays picked up. Relay 4SLP is picked up over the previously described circuit in response to a (+) impulse on the third step of the third cycle (code No. 19). Relay 4HR is picked up to clear signal 4SG over a circuit extending through front contacts 248, 249, 250, 251 and 252 of relays 4SLP, 4RR, 7T and 5T, back contact 253 of relay 45NCR, front contacts 254, 255, 244, 247 and 246 of relays 45RCR, 4T, 23RCR, 3T and 2T, to (—).

*Route No. 16.*—This is the reverse of code No. 14 with the same switch control, correspondence and route relays picked up. Relay 6SLP is picked up as previously described by the (+) impulse on the fifth step of the third cycle (code No. 23). Relay 6HR is picked up to clear signal 6SG over a circuit extending through front contacts 257, 258, 259, 251 and 252 of relays 6SLP, 6RR, 7T and 5T, back contact 253 of relay 45NCR, front contacts 254, 255, 244, 247 and 246 of relays 45RCR, 4T, 23RCR, 3T and 2T, to (—).

From the above examples relating to codes 1 and 7 for clearing routes in either direction over the upper track and codes 5, 6, 10 and 12 for clearing routes in either direction over the lower track, it will be understood that either of the routes over the upper track can be cleared at the same time either route over the lower track is cleared. In other words, the above described circuits in connection with non-conflicting routes can be made up for clearing traffic over these routes at the same time.

*Switch-locking circuits.*—Referring to Figs. 1 and 5, lock relay 23L locks switches 2TS and 3TS so that the positions of these switches cannot be changed as long as track relays 2T and 3T are de-energized to repeat the occupied conditions of the two track sections with which these relays are associated. Relay 23L is also de-energized as long as either correspondence relay 23NCR or 23RCR is picked up to repeat the condition that a control has been received and the switch actuated in response thereto. Relay 23L is also de-energized as long as either relay 1SCS or 2SCS is picked up. This latter de-energizing circuit is for the purpose of dropping relay 23L so that the route selecting circuit can be established when a signal code is received. The lock relay must be down in order to clear such signal circuit. Relay 23L is likewise de-energized as long as any signal associated with the track layout of Fig. 2 is clear as repeated by any one of the relays 1HR, 2HR, 3HR, 4HR and 5HR having their back contacts 84, 85, 86, 87 and 88 respectively, picked up.

Lock relay 45L protects switches 4TS and 5TS in a similar manner as long as either track relay 4T or 5T is de-energized, as long as either correspondence relay 45NCR or 45RCR is picked up and as long as either relay 1SCS or 2SCS is picked up. These two latter relays provide means for dropping relay 45L to lock the associated track switches before the route selecting circuit is completed. Relay 45L is also de-energized as long as any signal is cleared as manifested by the picking up of any of the above mentioned relays 1HR to 6HR inclusive.

Relay 7L locks track switch 7TS by remaining de-energized as long as either relay 7T is down or either relay 7NCR or 7RCR is picked up. Relay 3SCS picking up its back contact 65 provides a means for locking track switch 7TS so that the route selecting circuit by way of this track switch can be completed. By referring to the track layout of Fig. 2 it will be noted that track switch 7TS must be locked when signal 4SG or 6SG is cleared. This is provided by back contacts 89 and 90 of relays 4HR and 6HR respectively, de-energizing relay 7L. Likewise switch 7TS must be locked when signal 3SG is clear with track switches 2TS and 3TS normal, and when signal 1SG is clear with track switches 4TS and 5TS reversed. This is accomplished by relay 3HR de-energizing relay 7L at its back contact 91 when signal 3SG is clear, provided relay 45RCR at its back contact 92 and relay 23RCR at its back contact 93 in series or back contact 94 of relay 23NCR do not bridge contact 91 of relay 3HR.

If relay 3HR is picked up to clear signal 3SG with track switch 3TS in normal, then track switch 7TS must be locked by dropping relay 7L. This is accomplished by the energizing circuit for relay 7L being open at back contacts 91 and 94 of relays 3HR and 23NCR. If track switches 3TS and 2TS are in reverse, then it is not necessary to lock track switch 7TS by dropping relay 7L if track switches 4TS and 5TS are in normal, and in this case relay 7L is not deenergized because back contacts 94 and 92 are closed to bridge open back contact 91. Under the last mentioned condition, if track switches 4TS and 5TS are in reverse, then relay 7L must be de-energized and this is done because the circuit is open at contacts 93 and 92, both of which are opened by the picking up of relays 23RCR and 45RCR.

Relay 7L must also be deenergized to lock track switch 7TS when signal relay 1HR is picked up to clear signal 1SG for traffic over switches 4TS and 5TS in reverse. This is accomplished by relay 1HR opening up the circuit of relay 7L at back contact 95 only if back contact 96 of relay 45RCR is open as an indication that switches 4TS and 5TS are in reverse. If they are in normal then back contact 96 is closed to bridge back contact 95 and track switch 7TS is not locked, since in this event cleared signal 1SG does not clear traffic onto the lower track layout.

It will be understood that the back contacts on the correspondence relays which shunt the back contacts of the HR relays included in the circuit of relay 7L, may be replaced by front contacts on the opposite correspondence relay. For example back contact 96 of relay 45RCR (Fig. 5) can be replaced by a front contact on relay 45NCR for shunting back contact 95 on relay 1HR.

*Stop codes.*—It has already been explained how a signal is put to stop when the associated track section is occupied. In the event that the operator desires to put a signal to stop manually it is only necessary to transmit the stop code associated with the cleared signal. For example, (see Fig. 3) a (—) impulse on the third step of the second cycle (code No. 15) is effective to pick up lock relay 12S over a circuit including front contact 100 if relay 2SLP is energized. A (—) impulse on the fourth step of the second cycle (code No. 15) is effective to pick up relay 12S through front contact 121 if relay 1SLP is energized. Therefore a code comprising (—) impulses on the third and fourth steps of the second cycle will put the signals controlled by relays 1SLP and 2SLP (1SG and 2SG) to stop. This is accomplished by back contact 103 of relay 12S de-energizing the stick circuits of relays 1SLP and 2SLP. The dropping of either one of these relays de-energizes relays 1RR and 2RR and the circuits including the HR relay which clears the associated signal.

A (—) impulse on the third step of the third cycle with station relay CG³ picked up (code No. 24) is effective to pick up stop relay 346S by way of front contact 108 if relay 4SLP is picked up. Similarly a (—) impulse on the fourth step of this cycle will pick up relay 346S if relay 3SLP has its front contact 122 closed. A (—) impulse on the fifth step of this cycle will pick up relay 346S if relay 6SLP has its front contact 123 closed. This means that a code comprising (—) impulses on steps 3, 4 and 5 will be effective to pick up relay 346S when any signal associated with the lower track section of Fig. 2 is clear. The picking up of back contact 112 of relay 346S deenergizes the stick circuits of relays 3SLP, 4SLP and 6SLP so that these relays will be dropped to put their associated signals to stop.

Referring to Fig. 3, it will be noted that the dropping of relay 2T when the associated track is occupied deenergizes the stick circuit of relay 1SLP to put signal 1SG to stop. The dropping of front contact 124 of relay 4T when the associated track is occupied deenergizes the stick circuit of relay 2SLP including its front contact 125 which puts signal 2SG to stop. The dropping of front contact 113 of relay 3T deenergizes the stick circuit of relay 3SLP which puts signal 3SG to stop. The dropping of front contact 126 of relay 7T deenergizes the stick circuits of relays 4SLP and 6SLP including their stick contacts 127 and 128 respectively, so that signals 4SG and 6SG are put to stop.

*Selection of SCS relays.*—Referring to Fig. 5 and the above route table, an explanation will now be given of the selecting circuits which are made up for the SCS relays under the different conditions for providing stick circuits for the switch control relays.

*Route No. 1.*—A circuit is closed from (+), front contact 71 of relay 1SLP, front contact 72 of relay 23WN, winding of relay 1SCS, front contact 97 of relay 45WN, resistance R and back contact 98 of relay 2SLP, to (—). Relay 1SCS picks up its front contacts 76 and 77 and provides stick circuits for the switch control relays 23WN, 23WR, 45WN and 45WR.

*Route No. 2.*—A circuit is closed from (+), front contact 71 of relay 1SLP, front contact 72 of relay 23WN, winding of relay 1SCS, front contact 73 of relay 45WR, winding of relay 3SCS, front contact 99 of relay 7WN and back contact 129 of relay 4SLP, to (—). Relays 1SCS and 3SCS are picked up and connect (+) to the stick circuits of all switch control relays.

*Route No. 3.*—A circuit is closed from (+), front contact 71 of relay 1SLP, front contact 72 of relay 23WN, winding of relay 1SCS, front contact 73 of relay 45WR, winding of relay 3SCS, front contact 74 of relay 7WR and back contact 75 of relay 6SLP, to (—). Relays 1SCS and 3SCS apply (+) potential to the stick circuits of all switch control relays.

*Route No. 4.*—A circuit is closed from (+), front contact 130 of relay 3SLP, front contact 131 of relay 23WR, winding of relay 1SCS, front contact 97 of relay 45WN, resistance R and back contact 98 of relay 2SLP, to (—). Relay 1SCS connects (+) to the stick circuits of the switch control relays for switches 2TS, 3TS, 4TS and 5TS but since track switch 7TS is not involved in this route the stick circuit for these switch control relays is not energized.

*Route No. 5.*—A circuit is closed from (+), front contact 130 of relay 3SLP, front contact 132 of relay 23WN, winding of relay 2SCS, front contact 133 of relay 45WN, winding of relay 3SCS, front contact 99 of relay 7WN and back contact 129 of relay 4SLP, to (—). Relay 2SCS applies (+) potential to the stick circuits for the control relays which control track switches 2TS, 3TS, 4TS and 5TS and relay 3SCS applies (+) potential to the stick circuit of the switch control relays for track switch 7TS.

*Route No. 6.*—A circuit is closed from (+), front contact 130 of relay 3SLP, front contact 132 of relay 23WN, winding of relay 2SCS, front contact 133 of relay 45WN, winding of relay 3SCS, front contact 74 of relay 7WR and back contact 75 of relay 6SLP, to (—). Relays 2SCS and 3SCS energize the stick circuits of all the switch control relays, since all track switches of the layout are involved in this route.

It is not believed necessary to point out in detail the circuits of the remaining routes since they will be obvious from a comparison of these routes in the above code table with the circuits of Fig. 5. It will be noted that the SCS relays energize the stick circuits of the respective switch control relays under the various conditions in the manner previously explained.

*Description of modification.*—Fig. 6 illustrates a more complicated track layout than that of Fig. 2, together with the circuits for such a layout, which may be considered as a modification or an enlargement of the invention described in connection with the various other figures. This modification is provided to illustrate how the various selecting circuits of the SCS relays are made up so that uniform current flow will be maintained through each selected circuit under the various combinations of circumstances. As an example, it is proposed to make the resistance values of the SCS relays 40 ohms and the resistance values of the resistance units 40 ohms, with the exception of units 7R and 8R which are 80 ohms each.

Under certain conditions only one SCS relay is in circuit while under certain other conditions two and sometimes three SCS relays are in the completed selecting circuit. It is assumed that a complete selecting circuit comprises combinations of SCS relays and resistances so that the total resistance of an energized circuit is always approximately 160 ohms. Therefore when only one SCS relay is in circuit, three 40 ohms resistance units will be connected in the complete circuit before it is energized and when three SCS relays are in circuit only one 40 ohm resistance unit will be connected in the complete circuit.

The signals and switches of the track layout are given arbitrary reference characters for identification purposes. For example, the signals at the left are provided with the preceding reference character R and those at the right with reference character L, to indicate that these signals clear traffic in a right and a left direction respectively. The track switches are numbered in pairs, each pair being associated with a single crossover. When the selecting circuits of the SCS relays are made up through contacts of the SLP relays and the switch control relays, only those relays which would be associated with corresponding signals and switches of the track layout illustrated in Fig. 6 have been shown in connection with this circuit and part of the circuits which are made up are of the written type. It is believed that the selections made up under these various combinations can be more readily understood when the circuits are simplified by writing out certain contact designations instead of blocking in the relays with which these contacts are associated.

When a route is established from signal R59SG to L59SG, relay R59SLP will be picked up to energize the route selecting circuit and relays 62WN and 54 WN will be picked up to control the actuation of the corresponding switches to their normal positions. A circuit is now completed for picking up relay 54SCS which extends from (+), front contact 300 of relay R59SLP, resistances IR and 2R, front contact 301 of relay 62WN, winding of relay 54SCS, front contact 302 of relay 54WN, resistance 3R and back contact 303 of relay L59SLP, to (−). The total resistance of this circuit is assumed to be 160 ohms comprising the four units IR, 2R, 54SCS and 3R.

When a route is cleared from signal R61SG to L61SG, relays R61SLP, 64WN, 62WN, 54WN and 52WN will be picked up. A circuit is now closed for energizing relays 62SCS and 52SCS extending from (+), front contact 304 of relay R61SLP, resistance 4R, front contact 305 of relay 64WN, winding of relay 62SCS, front contact 306 of relay 62WN, front contact 307 of relay 54WN, winding of relay 52SCS, front contact 308 of relay 52WN, resistance 5R and back contact 309 of relay L61SLP, to (−). This circuit includes two resistance units and two relays making a total of 160 ohms.

When a route is cleared from signal R63SG to L63SG, relays R63SLP and 64WN will be picked up to close a circuit from (+), front contact 310 of relay R63SLP, resistance 6R, winding of relay 64SCS, front contact 311 of relay 64WN, resistance 7R and back contact 312 of relay L63SLP, to (−). This circuit includes one relay, one 40 ohm resistor (6R) and one 80 ohm resistor (7R), a total of 160 ohms.

When a route is cleared from signal R59SG to L61SG, relays R59SLP, 62WN, 54WR and 52WN are picked up. This closes a circuit from (+), front contact 300 of relay R59SLP, resistances IR and 2R in series, front contact 301 of relay 62WN, winding of relay 54SCS, front contact 213 of relay 54WR, winding of relay 52SCS, front contact 308 of relay 52WN, resistance 5R and back contact 309 of relay L61SLP, to (−). Resistors IR, 2R and 5R and relays 54SCS and 52SCS are included in this circuit, a total of 200 ohms. In order to reduce the resistance to the fixed value of 160 ohms it is necessary to short circuit one resistance unit under this condition. Resistor IR is short circuited at front contact 214 of relay 54WR.

When a route is cleared from signal R59SG to L51SG, relays R59SLP, 62WN, 54WR and 52WR are picked up. A circuit is closed from (+), front contact 300 of relay R59SLP, resistors IR and 2R, front contact 301 of relay 62WN, winding of relay 54SCS, front contact 213 of relay 54WR, winding of relay 52SCS, front contact 215 of relay 52WR, winding of relay 50SCS, resistance 9R and back contact 216 of relay L51SLP, to (−). Resistors IR, 2R and 9R and relays 54SCS, 52SCS and 50SCS are included in this circuit, a total of 240 ohms, so that it is necessary to remove two of the resistance units. Resistance 2R is short circuited by front contacts 217 and 218 of relays 54WR and 52WR respectively and resistance IR is short circuited by front contact 214 of relay 54WR.

The above explanation provides sufficient examples to indicate how the SCS relays are selected under the various conditions and how the selected circuits are maintained at a uniform resistance value under the various conditions. It is not believed necessary to explain in detail all of the possible routes which may be made up over the track layout illustrated, although all of these conditions are provided for in the circuit of Fig. 6. The various circuits will be obvious from this drawing when it is remembered that the SLP relay associated with the signal to be cleared over a particular route is picked up and the WN and WR relays are picked up when their associated track switches are to be actuated to normal or reverse positions respectively to establish a desired route.

It will be understood that the contacts controlled by the SCS relays are for the purpose of energizing the stick circuits for the switch control relays in different combinations under different conditions. For example, when the above mentioned route from signal R59SG to L59SG is established, relay 54SCS in picking up energizes the stick circuits for the switch control relays for switches 62 and 54 as indicated.

Having thus shown and described an interlocking system as one specific embodiment operating in connection with a station selective type communication system, it is desired to be understood that this form is selected to facilitate in the disclosure of the invention rather than to limit the number of forms which it may assume and it is to be further understood that various modifications, adaptations and alterations may be applied to the specific form shown to meet the requirements of practice, without in any manner departing from the spirit or scope of the invention except as limited by the appended claims.

What we claim is:—

1. In an interlocking system for railroads; a track layout containing a plurality of routes, each route containing a plurality of track switches and track sections joining said switches; a signal for governing traffic over each of said routes; a plurality of route circuits, each including a wire for each of said sections and a contact controlled by each of said track switches for the corresponding route; switch control means for governing the operation of each of said switches; locking means for said switch control means; signal control means for each route; relay means controlled by said signal control means for each route for energizing the corresponding established route circuit; and means rendering said relay means for a particular route continuously responsive to the signal control means for that route only when said switches are continuously in correspondence with their respective switch control means and the locking means for the switches of said route are in position for preventing the operation of the associated switch control means.

2. In an interlocking system for railroads, a plurality of routes over which a train may travel, a plurality of track switches in each route, route circuits corresponding to said routes, normally deenergized switch control relays for governing the operation of said switches, means responsive to manual control for selectively energizing said switch control relays and for selectively energizing one of said route circuits corresponding to one of said routes, and means responsive to the continued energization of said route circuit for maintaining said switch control relays energized in the positions to which they are actuated by said manual control.

3. In a centralized traffic controlling system for railroads, a track layout having the traffic thereover governed by different series of impulses transmitted over a line circuit from a remote location, track switches included in said layout, switch control relays for said track switches, a part of which are responsive to one series of impulses and another part of which are responsive to a successive series of impulses for controlling all of said switches, and slow acting means for holding the actuated switch control relays between successive series of impulses.

4. In a centralized traffic controlling system for railroads, a track layout having the traffic thereover governed by series of impulses transmitted over a line circuit from a remote location, track switches and signals included in said layout, switch and signal control relays respectively actuated by successive series of impulses for controlling said switches and signals, slow acting means for maintaining actuated those switch control relays actuated by one series of impulses until a successive series of impulses, and additional means controlled by said signal control relays for maintaining the actuated switch control relays.

5. In an interlocking system for railroads, a control office and a remote location connected by a line circuit, a stretch of track at said location, a plurality of track switches in said stretch of track, signals for governing traffic in opposite directions over said stretch of track, route means for said stretch of track comprising a circuit including contacts which assume positions in correspondence with the positions of said switches, a route relay at each end of said circuit, means for applying either of two polarities to each end of said circuit whereby the application of the same polarity at both ends prevents the energization of said route relays, a lock contact for each of said switches included in said circuit for preventing the energization of said route relays until the corresponding switches are locked, means controlled over said line circuit for selecting said location, and means controlled over said line circuit for selectively clearing said signals dependent upon the energization of said route relays.

6. In an interlocking system for railroads, a control office and a remote location connected by a line circuit, a stretch of track at said location, a plurality of track switches in said stretch of track, signals for governing traffic in opposite directions over said stretch of track, a control relay for each of said signals operable to a clear position in response to impulses transmitted over said line circuit, a first route circuit and a second route circuit, means responsive to the operation of any one of said control relays to a clear position for locking said switches by energizing said first route circuit and for energizing said second route circuit only when said switches are locked, and means responsive to the energization of said second route circuit for clearing the signal associated with the control relay which is operated.

7. In an interlocking system for railroads; a stretch of track divided into a plurality of sections; two signals, one at each end of said track for governing traffic in opposite directions thereover; track switches associated with said sections; switch control relays for operating said switches; signal control relays for each of said signals; a stick control relay energized by either of said signal control relays when traffic is to be cleared in either direction; means responsive to the energization of said stick control relay for locking said switches, and means for clearing one of said signals only when the corresponding signal control relay is actuated, said switches are locked and said switches are in correspondence with the associated switch control relays.

8. In an interlocking system for railroads, a control office and a remote location connected by a line circuit, a stretch of track at said remote location, a plurality of track switches in said stretch of track, power operated switch machines for operating said switches, switch control relays for governing the operation of said machines, signals for governing traffic over said stretch of track and said switches in either direction, signal control relays for governing the operation of said signals, means responsive to one series of current impulses transmitted over said line circuit for selectively operating said switch control relays, means responsive to another series of current impulses transmitted over said line circuit for selectively operating said signal control relays and means for electrically interlocking said switches and signals to permit said signals to display proceed indications in response to the operation of said signal control relays only after and only when said machines and their associated control relays are locked against operation and said signal control relays are in position to clear signals for only one direction.

9. In a centralized traffic controlling system, a control office and a remote location, a selector system over which distinctive control codes are transmitted from said office to said remote location, a track layout at said remote location including a plurality of track switches and track sections over which a plurality of routes are established, contacts for each switch indicating its position, a lock relay for each switch preventing the operation of the associated switch when deenergized, a route circuit for each of said routes including said contacts of the switches in the associated route and back contacts of the lock relays for each switch in said route, and means responsive to a distinctive code transmitted over said selector system for energizing said route circuit by current of a character depending on the direction in which traffic is to move over said route.

10. In a centralized traffic controlling system, a control office and a remote location, a selector system over which distinctive control codes are transmitted from said office to said remote location, a track layout at said remote location including a plurality of track switches and track sections over which a plurality of routes are established, contacts for each switch indicating its position, a lock relay for each switch preventing the operation of the associated switch when deenergized, a route circuit for each of said routes including said contacts of the switches in the associated route and back contacts of the lock relays for each switch in said route, means responsive to a distinctive code transmitted over said selector system for operating said switches and for energizing said route circuit by current of a character depending on the direction in which traffic is to move over said route, and means responsive to the proper response of said switches for deenergizing said lock relays.

11. In combination, a railway track switch, a switch control relay for controlling said switch, a signal for governing traffic over said switch, a signal control relay for controlling said signal, a lock relay which must be in its energized position to permit said switch to be controlled by said switch control relay, signal clearing means controlled over a circuit including a back contact of said lock relay and a contact which indicates the position of said switch, means including a selective stick circuit controlled by said signal control relay for deenergizing said lock relay, and means controlled over said selective stick circuit for sticking said switch control relay.

12. In a centralized traffic controlling system, a control office, a track layout including a plurality of routes each comprising a plurality of track switches, a line circuit connecting said office with said track layout, switch control relays selectively governed by coded impulses transmitted over said line circuit, local stick circuits for said switch control relays, stick control circuits which control said stick circuits and which are selected by said switch control relays, stick control relays selectively operated over said stick control circuits, and means controlled by said stick control relays for selectively energizing said stick circuits.

13. In a centralized traffic controlling system, a control office, a track layout including a plurality of routes each comprising a plurality of track switches, a line circuit connecting said office with said track layout, switch control relays selectively governed by coded impulses transmitted over said line circuit, local stick circuits for said switch control relays, stick control circuits which control said stick circuits and which are selected by said switch control relays, stick control relays selectively operated over said stick control circuits, said stick control circuits containing a variable number of stick control relays, means controlled by said stick control relays for selectively energizing said stick circuits, and means for equalizing said stick control circuits to compensate for the number of stick control relays included therein.

14. In a centralized traffic controlling system, a control office, a track layout including a plurality of routes each comprising a plurality of track switches, a line circuit connecting said office with said track layout, switch control relays selectively governed by coded impulses transmitted over said line circuit, local stick circuits for said switch control relays, stick control circuits selected by said switch control relays, stick control relays selectively operated over said stick control circuits, means controlled by said stick control relays for selectively energizing said stick circuits, and additional means controlled over said line circuit for energizing said stick circuits.

15. In combination a line circuit having a plurality of code combinations applied thereto, a plurality of track switches, switch machines for operating said switches, a plurality of signals for directing traffic over said switches, a plurality of switch control relays for controlling said switches, a plurality of signal control relays for controlling said signals, means responsive to a first code combination for actuating a plurality of said switch control relays, means responsive to a second code combination for actuating one of said signal control relays, and slow acting means for sticking the actuated switch control relays during the interval between the transmission of said first and second code combinations.

16. In combination; a line circuit having a plurality of code combinations applied thereto; a plurality of track switches; switch machines for operating said switches; a plurality of signals for directing traffic over said switches; a plurality of switch control relays for controlling said switches; a plurality of signal control relays for controlling said signals; means responsive to a first code combination for actuating a plurality of said switch control relays; means responsive to a second code combination for actuating one of said signal control relays; means responsive to a third code combination for actuating another of said signal control relays; and slow acting means for sticking the actuated switch control relays during the intervals between the transmission of said first, second and third code combinations.

17. In combination; a line circuit having a plurality of code combinations applied thereto; a plurality of track switches; switch machines for operating said switches; a plurality of signals for directing traffic over said switches; a plurality of switch control relays for controlling said switches; a plurality of signal control relays for controlling said signals; means responsive to a first code combination for actuating a plurality of said switch control relays; means responsive to a second code combination for actuating one of said signal control relays; means responsive to a third code combination for actuating another of said signal control relays; slow acting means for sticking the actuated switch control relays during the intervals between the transmission of said first, second and third code combinations; and means controlled by said signal control relays for simultaneously clearing a plurality of said signals.

18. In combination, a line circuit having a plurality of code combinations applied thereto, a plurality of track switches, a plurality of signals for clearing traffic over said switches, a plurality of switch control relays actuated by one of said code combinations for governing said track switches, a plurality of signal control relays actuated by other of said code combinations for energizing said signals, a plurality of correspondence relays for registering correspondence between said track switch and said switch control relays, means controlled by said correspondence relays for locking said switches, and means controlled by said correspondence relays and said signal control relays for clearing said signals only when said switches are locked.

19. In an interlocking system for railroads; a stretch of track divided into a plurality of sections; two signals, one at each end of said track for governing traffic in opposite directions thereover; track switches associated with said sections; switch control relays for operating said switches; signal control relays for each of said signals; a stick control relay energized by either of said signal control relays when traffic is to be cleared in either direction; means responsive to the energization of said stick control relay for locking said switches and said switch control relays; and means for clearing one of said signals only when the corresponding signal control relay is actuated, said switches are locked and said switches are in correspondence with the associated switch control relays.

20. In combination, a field location comprising a stretch of railroad track including a plurality of track switches, a plurality of switch control relays for controlling said track switches, a plurality of signals for governing traffic over said stretch of track, a plurality of signal control relays for controlling said signals, a line circuit connecting said field location with a distant control office, means responsive to a first code comprising a first series of impulses received over said line circuit for selectively operating said switch control relays, a stick circuit control relay at said field station, means controlled by said stick circuit control relay in its operated position for sticking any operated switch control relay, means responsive to a second code comprising a second series of impulses received over said line circuit for selectively operating said signal control relays, means controlled over said line circuit for operating said stick circuit control relay, and means for maintaining said stick circuit control relay operated for a period of time sufficient to bridge the interval between two uninterrupted series of impulses.

21. In combination, a field location comprising a stretch of railroad track including a plurality of track switches, a plurality of switch control relays for controlling said track switches, a plurality of signals for governing traffic over said stretch of track, a plurality of signal control relays for controlling said signals, a line circuit connecting said field location with a distant control office, means responsive to a first code comprising a first series of impulses received over said line circuit for selecting said field location and selectively operating said switch control relays, a stick circuit control relay at said field station, means controlled by said stick circuit control relay in its operated position for sticking any operated switch control relay, means responsive to a second code comprising a second series of impulses received over said line circuit for selecting said field location and selectively operating said signal control relays, means controlled over said line circuit for operating said stick circuit control relay only at the selected field location, and means for maintaining said stick circuit control relay operated for a period of time sufficient to bridge the interval between two uninterrupted series of impulses.

22. In combination, a location including a traffic route including a plurality of railway switches, a signal at each end of the route to govern traffic in opposite directions through the route, a remote controlled switch controlling relay for each position of each switch of the route to govern the operation of the respective switch, an operating circuit for each signal, a preliminary remote controlled signal controlling relay for each signal to prepare the operating circuit for the signal, a final signal controlling relay for each signal to complete the operating circuit for the signal, means including said preliminary remote controlled signal controlling relay for energizing said final signal controlling relays arranged to be closed only when each switch of the route is in correspondence with its remote controlled switch controlling relays and each switch of the route is locked, means controlled by the energization of each final signal control relay for energizing the associated signal operating circuit only when each switch of the route is in correspondence with its remote controlled switch controlling relays, and means controlled by combinations of coded impulses received from a remote location for selectively operating said remote controlled switch and signal controlling relays.

23. In an interlocking system for railroads; a plurality of track sections interconnected by track switches to thereby form a plurality of routes over which traffic may pass; a power operated switch machine for each of said track switches; normally deenergized switch control relays for each track switch for governing its respective switch machine; signals for governing traffic over said routes; a normally deenergized signal control relay for each of said signals; circuit means for each signal for clearing that one of said signals in response to the energization of its said signal control relay only when said switch control relays for the switches in a particular route governed by such signal are properly energized to establish such route and the corresponding switches have properly responded to their respective switch control relays; a selector type communication system extending from said track sections to a central office; means for selectively energizing said switch and signal control relays only momentarily over said communication system in response to manual control in the central office to establish a particular route and clear its governing signal; circuit means effective for maintaining energized those of said switch control relays, which are selectively energized to establish said particular route, dependent upon the energized condition of said signal control relay for that route only if all of said switch control relays for that route are energized; and circuit means for maintaining energized said signal control relay for that particular route, after it has been selectively energized, subject to a subsequent deenergizing control transmitted over said communication system from said central office.

24. In an interlocking system for railroads, a plurality of track sections interconnected by track switches to thereby form a plurality of routes over which traffic may pass; a power operated switch machine for each of said track switches; normally deenergized switch control relays for each track switch for governing its respective switch machine; signals for governing traffic over said routes; a normally deenergized signal control relay for each of said signals; circuit means for each signal for clearing that one of said signals in response to the energization of its said signal control relay only when said switch control relays for the switches in a particular route governed by such signal are properly energized to establish that route and the corresponding switches have properly responded to their respective switch control relays; a selector type communication system extending from said track sections to a central office and operable through cycles of operation for the transmission of controls from the central office; means for selectively energizing said switch control relays only momentarily over said communication system in response to manual control in the central office to establish a particular route; means for selectively energizing said signal control relays only momentarily over said communication system in response to manual control in the central office to clear the governing signal for a particular route; circuit means effective for maintaining energized those of said switch control relays, which are selectively energized to establish a particular route, dependent upon the energized condition of said signal control relay for that route only if all of said switch control relays for that route are energized; circuit means for maintaining energized said signal control relay for a particular route, after it has been selectively energized, subject to a subsequent deenergizing control transmitted over said communication system from said control office; slow acting means effective to maintain energized those of said switch controlling relays which are selectively energized, for a predetermined time after the reception of a momentary selective control for such switch controlling relays over said communication system.

25. In an interlocking system for railroads, a plurality of track sections interconnected by track switches to thereby form a plurality of routes over which traffic may pass; a power operated switch machine for each of said track switches; normally deenergized switch control relays for each track switch for governing its respective switch machine; signals for governing traffic over said routes; a normally deenergized signal control relay for each of said signals; circuit means for each signal for clearing that one of said signals in response to the energization of its said signal control relay only when said switch control relays for the switches in a particular route governed by such signal are properly energized to establish such route and the corresponding switches have properly responded to their respective switch control relays; a selector type communication system extending from said track sections to a central office and operable through cycles of operation for the transmission of controls from the central office; means for selectively energizing said switch control relays only momentarily during one cycle of operation of said communication system in response to manual control in the central office to establish a particular route; means for selectively energizing said signal control relays only momentarily during another cycle of operation of said communication system in response to a manual control in the central office to clear the governing signal for a particular route; stick circuit means effective for maintaining energized those of said switch control relays, which are selectively energized to establish a particular route, dependent upon the energized condition of said signal control relay for that route only if all of said switch control relays for that route are energized; circuit means for maintaining energized said signal control relay for that particular route, after it has been selectively energized, subject to a subsequent deenergizing control transmitted over said communication system from said control office; and means effective to maintain energized during a cycle of operation those of said switch control relays which are selectively energized during such cycle of operation, said means also being effective for a predetermined time after such cycle of operation, whereby said switch control relays are maintained energized until said stick circuit means becomes effective irrespective of the order of the cycles of operation for controlling said switch and signal control relays.

26. In an interlocking system for railroads, a plurality of track sections interconnected by track switches to thereby form a plurality of routes over which traffic may pass; a power operated switch machine for each of said track switches; normally deenergized switch control relays for each track switch for governing its respective switch machine; signals for governing traffic over said routes; a normally deenergized signal control relay for each of said signals; circuit means for each signal for clearing that one of said signals in response to the energization of its said signal control relay only when said switch control relays for the switches in a particular route governed by such signal are properly energized to establish such route and the corresponding switches have properly responded to their respective switch control relays; a selector type communication system extending from said track sections to a central office and operable through cycles of operation for the transmission of controls from the central office; means for selectively energizing said switch control relays only momentarily over said communication system in response to manual control in the central office to establish a particular route; said means acting through a plurality of cycles of operation of said communication system in order to effect control of all of said switch control relays for the switches of that route; means for selectively energizing said signal control relays only momentarily on a different cycle of operation of said communication system in response to manual control in the central office to clear the governing signal for said particular route; circuit means effective for maintaining energized those of said switch control relays, which are selectively energized to establish a particular route, dependent upon the energized condition of said signal control relay for that route only if all of said switch control relays for that route are energized; circuit means for maintaining energized said signal control relay for a particular route, after it has been selectively energized, subject to a subsequent deenergizing control transmitted over said communication system from said control office; and means associated with said switch control relays and rendered effective on a cycle of operation of said communication system for controlling said switch controlling relays to maintain such switch controlling relays energized, said means remaining effective so long as and only so long as said communication system operates through continuously successive cycles of operation for the transmission of controls, whereby said selectively energized switch control relays are maintained energized irrespective of the number of cycles of operation required to operate all of the switch controlling relays and also irrespective of the order of the switch and signal controlling cycles of operation.

27. In an interlocking system for railroads; a plurality of track sections interconnected by track switches to thereby form a plurality of routes over which traffic may pass; a power operated switch machine for each of said track switches; normally deenergized switch control relays for each track switch for governing its respective switch machine; signals for governing traffic over said routes; a normally deenergized signal control relay for each of said signals; circuit means for each signal for clearing that one of said signals in response to the energization of its said signal control relay only when said switch control relays for the switches in a particular route governed by such signal are properly energized to establish such route and the corresponding switches have properly responded to their respective switch control relays; a selector type communication system extending from said track sections to a central office; means for selectively energizing said switch and signal control relays only momentarily over said communication system in response to manual control in the central office to establish a particular route and clear its governing signal; holding circuit means effective for maintaining energized those of said switch control relays, which are selectively energized to establish said particular route, dependent upon the energized condition of said signal control relay for that route only if all of said switch control relays for that route are energized; circuit means for maintaining energized said signal control relay for that particular route, after it has been selectively energized, subject to a subsequent deenergizing control transmitted over said communication system from said central office; locking means for each track switch for preventing the control of its respective switch controlling relays over said communication system when such locking means is rendered effective; and means rendering said locking means effective for each of the track switches included in the particular route upon the rendering effective of said holding circuit means for that route.

28. In combination, a line circuit having a plurality of code combinations applied thereto, a plurality of track switches, switch machines for operating said switches, a plurality of signals for directing traffic over said switches, a plurality of switch control relays for controlling said switches, a plurality of signal control relays for controlling said signals, a plurality of control means for controlling said switch control relays and said signal control relays, means responsive to a first code combination for actuating one of said control means, means responsive to a second code combination for actuating another of said control means, and slow acting means for maintaining the effect of the first actuated control means during the interval between the transmission of said first and second code combinations.

CHARLES S. BUSHNELL.
WINFRED T. POWELL.

DISCLAIMER 2,060,413.—*Charles S. Bushnell* and *Winfred T. Powell*, Rochester, N. Y. INTERLOCKING SYSTEM FOR RAILROADS. Patent dated November 10, 1936. Disclaimer filed April 4, 1938, by the assignee, *General Railway Signal Company*.

(1) Hereby disclaims claim 1.

(2) Hereby disclaims from claims 9 and 22 any system, except wherein the "distinctive control codes" (claim 9) or the "combinations of coded impulses" (claim 22) each comprise a plurality of successive time spaced code elements.

[*Official Gazette April 26, 1938.*]